United States Patent
Brauer et al.

(10) Patent No.: US 6,267,535 B1
(45) Date of Patent: Jul. 31, 2001

(54) DEPOSITING PARTICULATE MATERIAL OR SOIL ONTO PLASTIC FILM EXTENDING OVER A FACE OF A LANDFILL OR OTHER LOCATION

(75) Inventors: John L Brauer; David K L Noller; Jonathan A N Harris, all of Gold Coast (AU); Russell B Brown, Cokato, MN (US)

(73) Assignee: EPI Environmental Products Inc. (CA)

( * ) Notice: Subject to any disclaimer, the term of this patent is extended or adjusted under 35 U.S.C. 154(b) by 0 days.

(21) Appl. No.: 09/380,549

(22) PCT Filed: Mar. 3, 1998

(86) PCT No.: PCT/AU98/00134

§ 371 Date: Sep. 2, 1999

§ 102(e) Date: Sep. 2, 1999

(87) PCT Pub. No.: WO98/39113

PCT Pub. Date: Sep. 11, 1998

(30) Foreign Application Priority Data

Mar. 6, 1997 (AU) .................................................. PO5483
Sep. 26, 1997 (AU) .................................................. PO9436

(51) Int. Cl.⁷ .................................................. E02B 3/12
(52) U.S. Cl. .................................................. 405/129.9
(58) Field of Search .................................. 405/128, 129, 405/270, 268, 258, 264, 36; 47/9; 111/63, 64, 144, 200; 222/185.1, 444

(56) References Cited

U.S. PATENT DOCUMENTS

| | | | |
|---|---|---|---|
| 4,175,496 | * 11/1979 | Rehbein | 111/200 |
| 4,786,208 | * 11/1988 | Raviv | 405/270 |
| 4,909,667 | * 3/1990 | DeMello | 405/128 |
| 5,230,587 | 7/1993 | Pensoneau . | |
| 5,258,217 | 11/1993 | Lewis . | |
| 5,304,014 | * 4/1994 | Slutz | 405/129 |
| 5,536,116 | * 7/1996 | Lammers et al. | 405/129 |
| 5,620,281 | * 4/1997 | Lammers et al. | 405/129 |
| 6,139,663 | * 10/2000 | Payne | 405/270 |

FOREIGN PATENT DOCUMENTS

| | | |
|---|---|---|
| 3641 780 | 9/1987 | (DE) . |
| 2 129 857 | 5/1984 | (GB) . |
| WO 94/20689 | 9/1994 | (WO) . |
| WO 95/15825 | 6/1995 | (WO) . |

* cited by examiner

Primary Examiner—David Bagnell
Assistant Examiner—Frederick L. Lagman
(74) Attorney, Agent, or Firm—Nixon & Vanderhye P.C.

(57) ABSTRACT

An apparatus having at least one rotatably mounted storage container (44, 45), at least two outlet openings (48, 49, 51, 52) in the container from which material within the container may be dispersed as the container rotates such that a discrete amount of material is dispensed from each outlet once per rotation of the container, the openings being located at longitudinally spaced locations in the container, a respective metering means (69, 71) associated with each said opening for collecting the discrete amount of material and for dispersing the discrete amount of material as the container is caused to rotate and a roll of material (31) carried by the apparatus and mounted to pay out material from the roll as the apparatus is transported over a surface whereby the discrete amounts of material dispensed from the container are deposited at spaced locations onto the material from the roll to anchor the material from the roll relative to the surface.

32 Claims, 26 Drawing Sheets

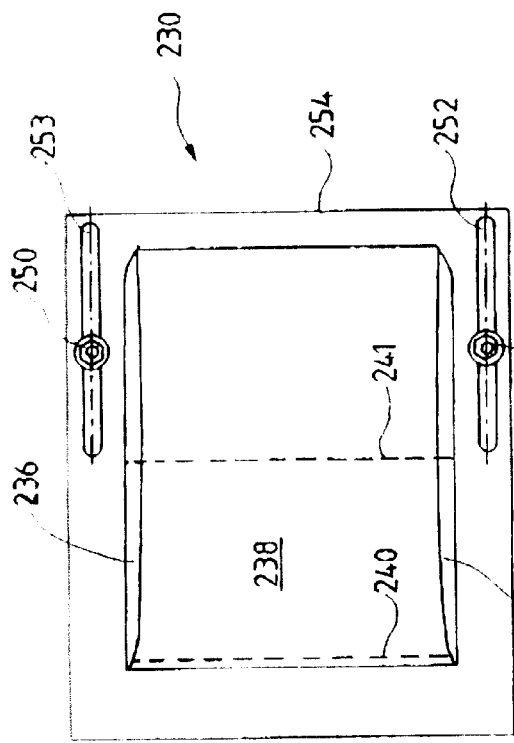
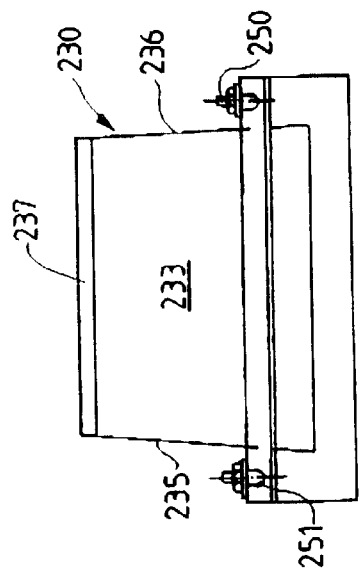
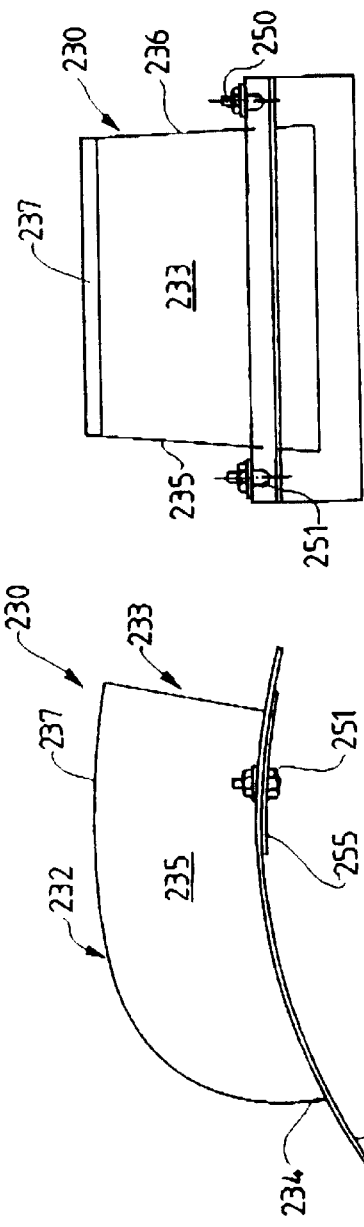

DEPOSITING PARTICULATE MATERIAL OR SOIL ONTO PLASTIC FILM EXTENDING OVER A FACE OF A LANDFILL OR OTHER LOCATION

BACKGROUND OF THE INVENTION

This invention relates to an apparatus for depositing particulate material or soil onto plastic film extending over a face of a landfill/or other location.

U.S. Pat. No 5,536,116 discloses a machine secured to or carried by a compactor or bulldozer. The machine had a roller for degradable plastic film. Above the roller, the machine was provided with a hopper structure which carries and distributes particulate material, typically soil, onto edges of the film as the compactor moves over the landfill and covers the landfill with film.

The hopper structure had two augers located within respective hoppers with the augers being oppositely handed and located in lower portions of the hoppers. Lower wall portions of the hopper were closely adjacent to flights of the augers. Each hopper had two discharge openings.

In use, the machine of U.S. Pat. No. 5,536,116 was traversed over the landfill and the film was unrolled from the roll to cover the landfill. At the same time, the augers were rotated to dispense gravel, dirt or other available material against the film to anchor the film until the covered area of the landfill had more waste deposited on it.

Prior to the development of the machine of U.S. Pat. No. 5,536,116, the practice of covering or backfilling waste in a landfill with available soil or the like was carried out for health reasons. Such backfilling was carried out periodically during the course of a day and certainly at the end of a working shift at the landfill. Backfilling with available soil, although necessary for health reasons, nevertheless had its disadvantages in that if no soil was available at the landfill, it would then need to be trucked in in considerable quantities. In addition, the very presence of this type of backfill reduced the capacity of the landfill for waste. These disadvantages lead to the development of the machine of U.S. Pat. No. 5,536,116.

This machine, by employing degradable film to cover waste in the landfill, did not unduly reduce the capacity of the landfill site even though available soil in relatively small quantities was employed to hold the film in place until it was covered with waste in a subsequent waste dumping operation.

Considerable energy was necessary to drive the augers in this earlier machine. The available soil often contained large rocks and other solids which could not be dispensed by the augers and readily jammed the augers leading to damage of the machine. In addition, the augers could only dispense relatively loose soils and tended to bind if the soil had a high clay content or was unduly moist.

Thus, the machine of U.S. Pat. No. 5,536,116 although providing an advance required suitable soil or the like to be transported to landfill sites to be used in the machine in place of soils with a high clay content or high large aggregate content normally available at the site. This proved undesirable.

BRIEF DESCRIPTION OF THE INVENTION

It is an object of the present invention to provide an apparatus for depositing particulate material or soil onto film extending over a face of a landfill which at least minimises the disadvantage referred to above.

Accordingly to one aspect, the invention provides an apparatus having at least one rotatably mounted storage container, at least two outlet openings in the container from which material within the container may be dispensed as the container rotates, the openings being located at longitudinally spaced locations in the container and a respective metering means associated with each said opening for collecting a discrete amount of the material from the container and for dispensing the discrete amount of the material as the container is caused to rotate.

The metering means may consist of one or more baffles. If the metering means consists of one baffle only, it is advantageously located on an exterior surface of the container adjacent a respective opening.

The baffle may extend from or adjacent to one edge of the opening, outwardly of the container and terminate beyond an opposed edge of the opening to provide a receiving space for soil or the like between the baffle and the container. If desired, a deflector plate may extend from the one edge of the opening and into the container.

Alternatively, where the metering means consists of two baffles, these baffles may either be located within the container or one may be within and the other may be located outside the container.

The two baffle metering means functions so that one of the baffles is a collecting baffle into which a discrete quantity of soil or the like is deposited as the container rotates while the other baffle functions as a deflecting baffle which deflects soil falling from the collecting baffle towards the opening as the container rotates.

Where there are two baffles which together make up a metering means and one of the baffles is located outside the container, it is preferred that the outside baffle be adjustable in its position relative to the container to allow the size of the dispensing opening to be varied. Adjustment of the outer baffle between two limit positions is preferred. The outer baffle may selectively be locked at relative to the container at locations between the limit positions.

The baffles are preferably arcuate in shape.

if desired, the metering means in a container at spaced locations along it may be radially displaced relative to one another. More than two metering means may be provided for the container. Preferably, four such metering means are present.

The container may have a lid which allows the container to be filled with material to be dispensed. The lid may be hinged to the container or removably mounted to it. When the lid is hinged to or removed from the container a filling opening is exposed to allow material to be deposited into the container. The opening may include a screen or grid for filtering the material deposited into the container to exclude particles greater than a predetermined size. A grate and in particular a mesh grate, may be used for this purpose.

The container may have any suitable transverse cross sectional shape. Preferably, the container is circular in traverse shape. The metering means, if four are present in a circular container, may be located in diametrically opposed pairs at spaced locations along the container.

It is preferred that the apparatus consist of two rotatable containers of the type discussed. The two containers may be arranged along a common longitudinal rotation axis and spaced therefrom. A common drive may be used to rotate both containers. Preferably the containers are spaced apart from one another and the drive is located between them.

The interior wall of each container may be provided with one or more directing flights. Where there are two outlet openings in a container, one such flight is associated with these openings. Where the container has four outlet openings, a separate such flight is associated with each pair of openings in the body of the container.

The directing flights are constructed such that where there are two containers arranged end to end, the outlet openings have equal quantities of material directed towards them as the containers rotates. In this way, the edges of the film adjacent the outermost outlet are securely anchored to cover the landfill.

The directing flight may consist of a bar secured to an inner wall of the container. The flight may follow a part helical path and have a pitch substantially greater than the diameter of the container. The part helical path may peak at a location near to one of the outlet openings to provide for this preferred distribution of material.

BRIEF DESCRIPTION OF THE DRAWINGS

A preferred embodiment of the apparatus of the invention will now be described by way of example with reference to the drawings in which:

FIGS. 6a, 6b and 6c are views showing the operation of the metering means of FIG. 5a;

FIGS. 25a, b and c are side, plan and elevational views of an alternative metering means.

DETAILED DESCRIPTION OF THE INVENTION

Figure 1:
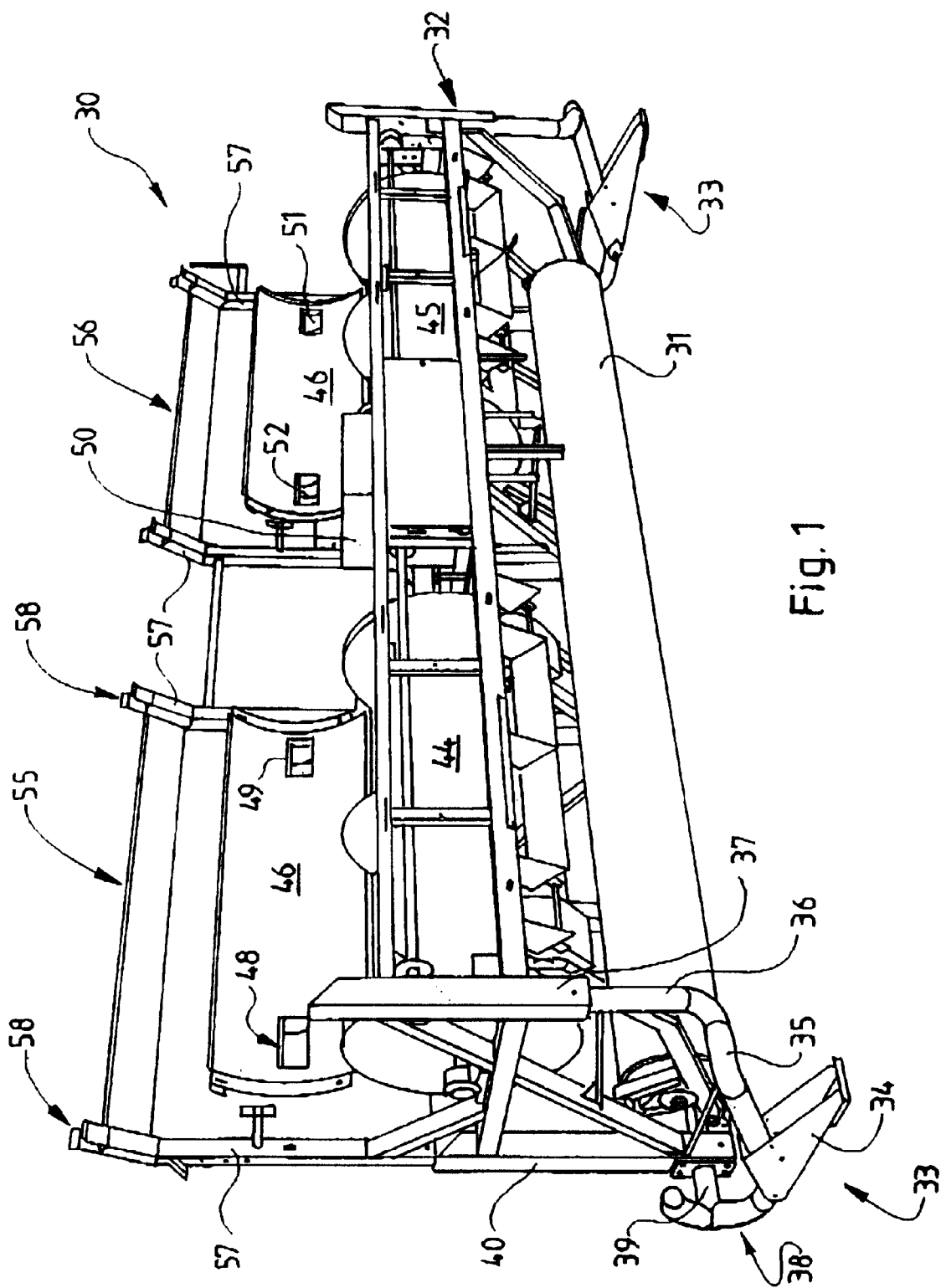
FIG. 1 is a perspective view of an apparatus according to an embodiment of the invention.

FIG. 1 shows an apparatus 30 for covering the surface of a landfill or other surface with a film of plastic material, typically a biodegradable plastic film. The apparatus 30 has a roll 31 of film rotatably mounted to a frame 32. The roll 31 rotates as the apparatus is conveyed over the surface being covered to cause the film to be unrolled from the roll to cover the surface. The construction of the roll 31 and the manner in which it is rotated may be the same as that shown in U.S. Pat. No. 5,536,116.

The apparatus 30 has legs or skids 33 consisting of a foot 34 and a connecting member having member 35 with a portion 36 received by frame member 37 of the frame 32 and a member 38 with a portion 39 mounted to frame member 40 of the frame 32. Portion 36, member 35, member 38 and portion 39 form a continuous connection between frame members 37 and 40. The skid at the right hand end of the apparatus is similarly constructed to that just described. The skid foot 34 may be pivoted between the position shown where the apparatus is in its storage position to a retracted position where the skids are elevated from the ground to allow the apparatus to be deployed and pinned relative to member 35 to retain it in one or other of these positions. Portion 36 may be locked relative to the frame member to maintain the skid in one or other of its two positions.

The apparatus 30 has two containers 44 and 45 from which particulate material such as soil may be dispensed. The containers 44 and 45 are rotatably mounted to the frame 32 and are arranged extending along a common axis but spaced from one another. Each container has a hinged lid 46. Container lids 46 for each container has an outermost metering means 48, 51 located at one end of the apparatus and an innermost metering means 49, 52 located adjacent a location where a drive unit 50 is situated. The body of the containers 44, 45 each have two further metering means (not visible in this figure).

Figure 2:
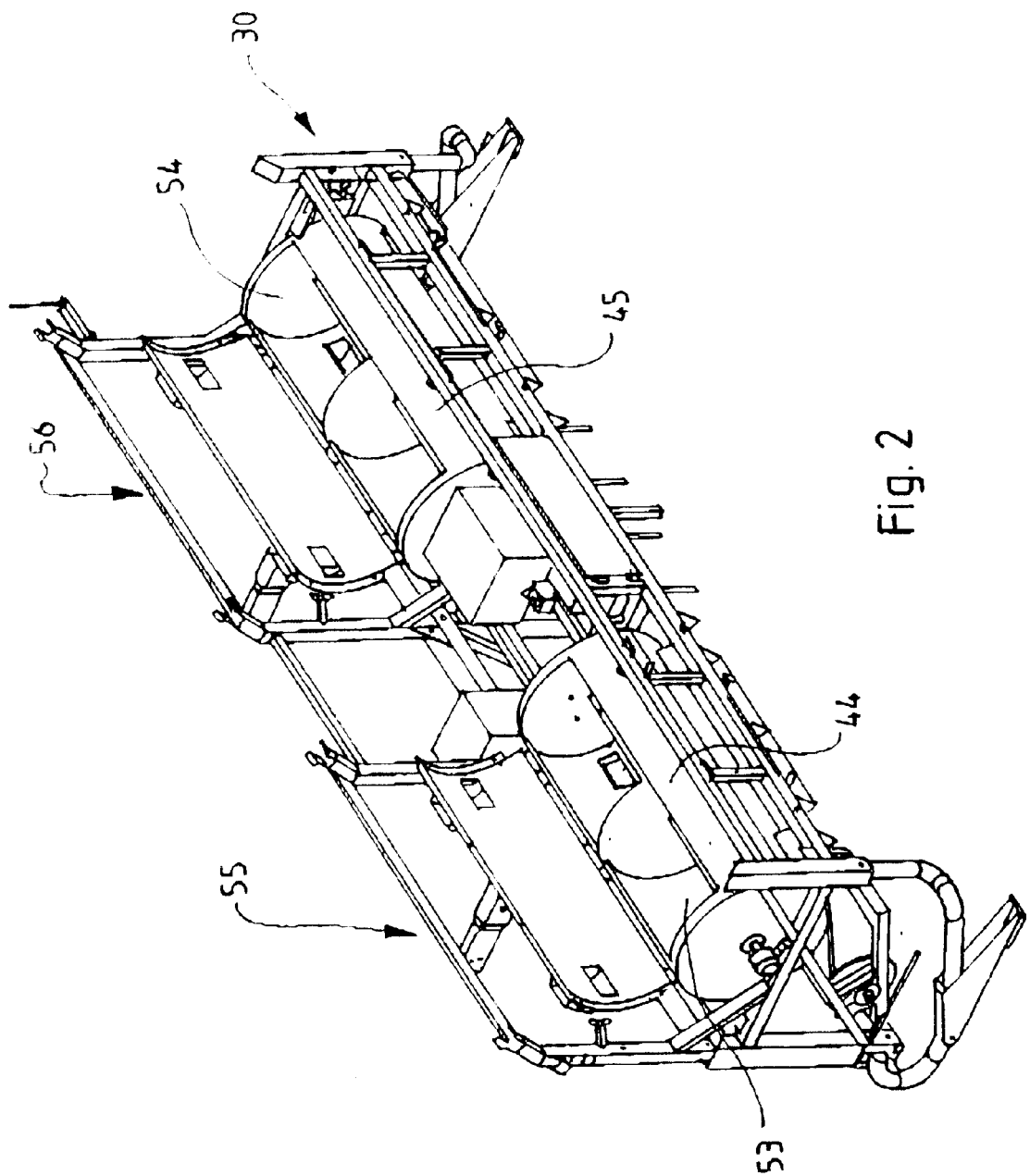
FIG. 2 is a perspective view of the apparatus of FIG. 1 viewed from above.

The apparatus 30 is shown from above in FIG. 2. In this view, inlet openings 53, 54 which allow the containers 44 and 45 to be filled with particulate material are shown. The inlet openings may be covered with respective grates (not shown) to ensure that only particulate material of a predetermined size is allowed to be deposited into the containers. In FIGS. 1 and 2, the frame has upstanding frame portions 55 and 56 which have upstanding posts 57 which terminate in stirrups 58. These stirrups are adapted to pivotally receive grate panels described in greater detail later with reference to FIGS. 7, 14 and 15 of the drawings.

Figure 3:
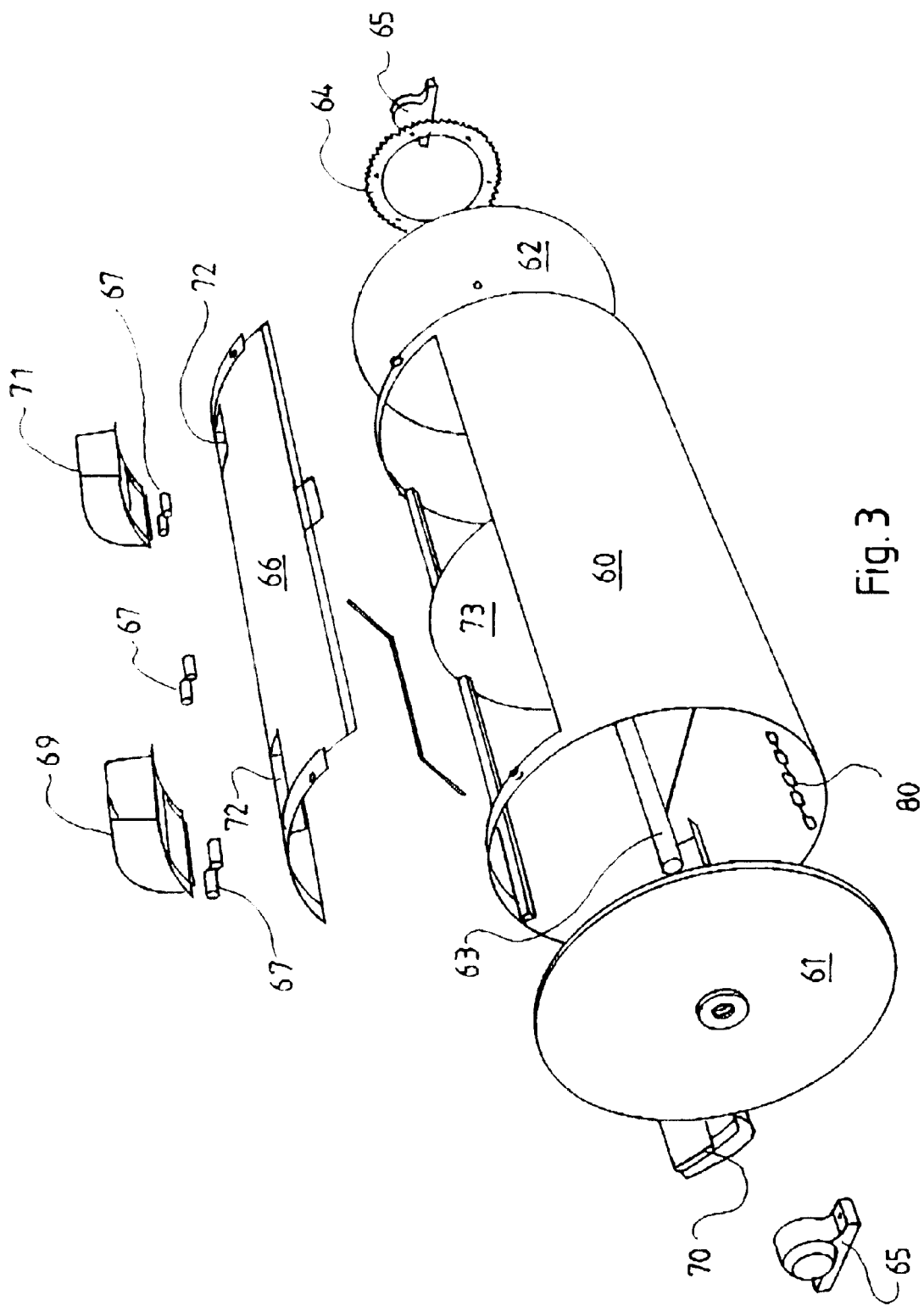
FIG. 3 is an exploded perspective view of a container which forms part of the invention.

FIG. 3 shows an exploded view of container 44. Container 45 is similarly constructed. The container has a body 60 which in this embodiment is cylindrical and has circular ends 61 and 62. An axle 63 extends along the body 60 and projects through the ends 61, 62. Instead of a continuous axle, two shot stub axles (not shown) may be employed with the stub axles being secured to and extending outwardly from the ends 61, 62. Sprocket 64 is fixed to one end of the axle 63 and when driven causes the container to rotate. The axle 63 is journalled in bearings 65. The container 44 has a lid 66 with hinge parts 67 for pivotally securing the lid to the body 60.

The container 44 has metering means 69, 70, 71 and a further metering means 70a (see FIG. 4) in the body like metering means 70. Means 69 and 71 are located on the lid 66. Means 69 and 70 are diametrically opposed as are the other two metering means previously mentioned. Each container may have more than two metering means and in which case the means need not be diametrically opposed. The metering means locate relative to apertures 72 in the lid and corresponding apertures in the body. The container 44 is divided into two compartments by a partition 73. Each of the compartments has a chain 80 secured to an inner wall of the body 60 and the chain functions to break up soil placed within the container as the container rotates. A spring 81 is present and extends between the lid 66 and the body 60 of the container.

Figure 4:
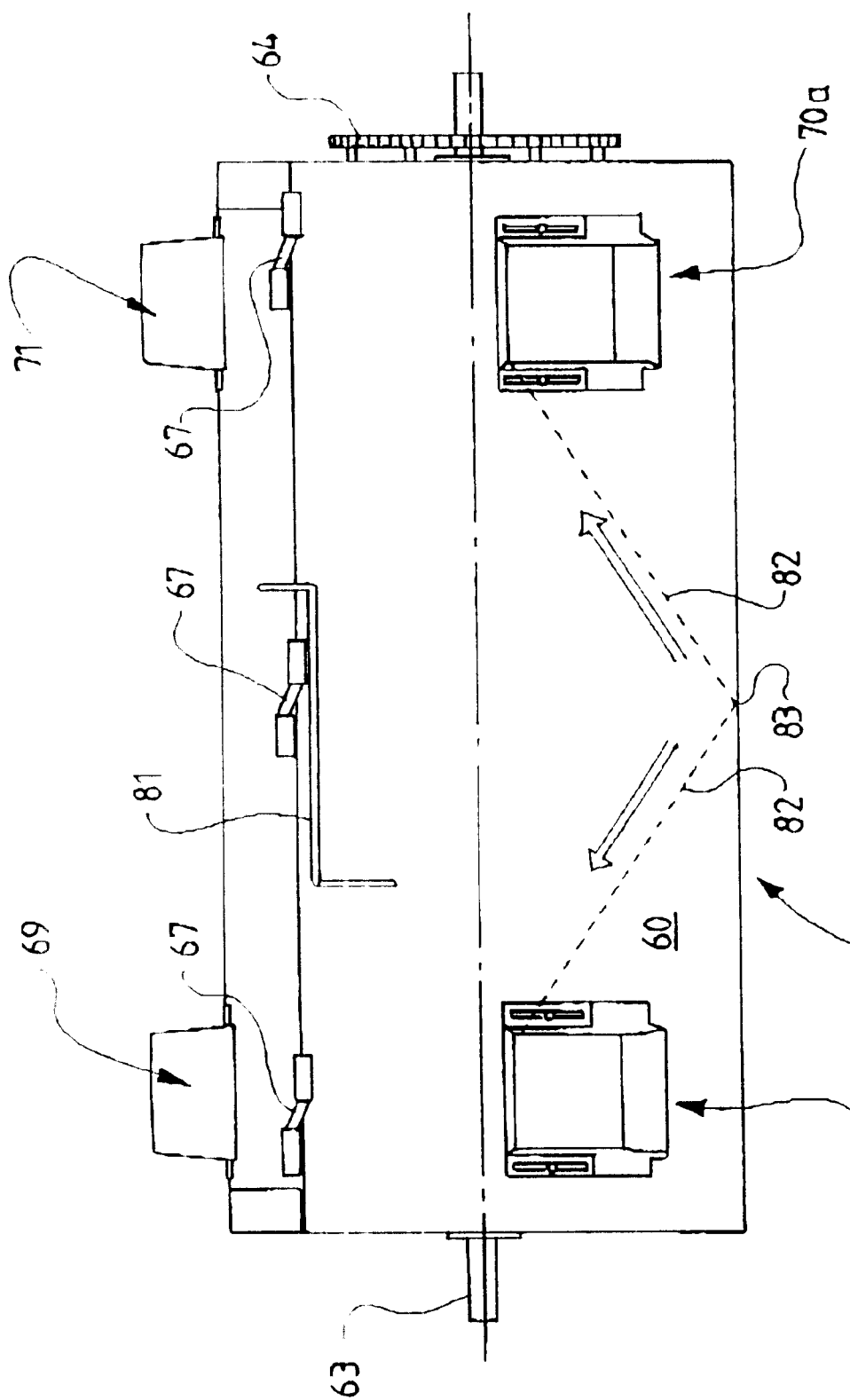
FIG. 4 is a detailed elevational view of a container of the apparatus of the invention.

FIG. 4 shows an assembled view of the container 44. The interior wall of the body has an upstanding flight 82 which may be extended along a part helical path along the wall. The peak 83 is shown located midway between dispensing means 70 and 70a but need not be. When the container rotates, the flight 82 directs material towards the dispensing means and with the peak 83 centrally located equal amounts of material is directed to the metering means.

Figure 5A:
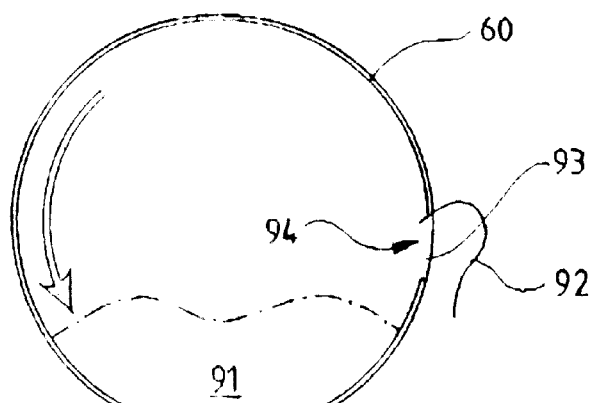
FIGS. 5a, 5b and 5c show diagrammatic view of alternative metering means.

FIGS. 5a, b and c show alternative metering means with FIG. 5a showing the preferred means illustrated in FIG. 3.

Figure 5B:
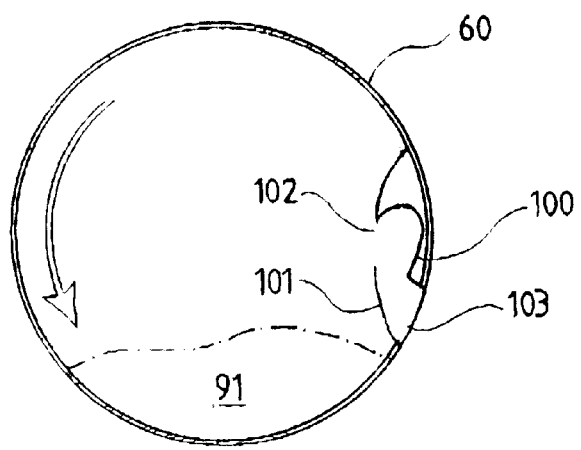

In these figures, the arrow shows the direction of rotation of the container body 60. These containers have soil 91 within them. In FIG. 5a, the dispensing means consists of a fixed external baffle 92 which extends over an outlet opening 93. A deflector plate 94 extends into the container from a leading edge of opening 93. As the container body 60 rotates, a discrete quantity of soil is first collected in the baffle. Further rotation allows just that quantity to be dispensed and deposited onto the plastic film unrolled from the apparatus. In FIG. 5b, the dispensing means consists of a collecting baffle 100 and a deflecting baffle 101. As the container rotates soil 91 passes through opening 102 and a discrete quantity is collected by the baffle 100. Further rotation of the container causes the soil to fall from baffle 100 onto baffle 101 which deflects the soil as it falls and directs it through opening 103 and onto the plastic film.

Figure 5C:
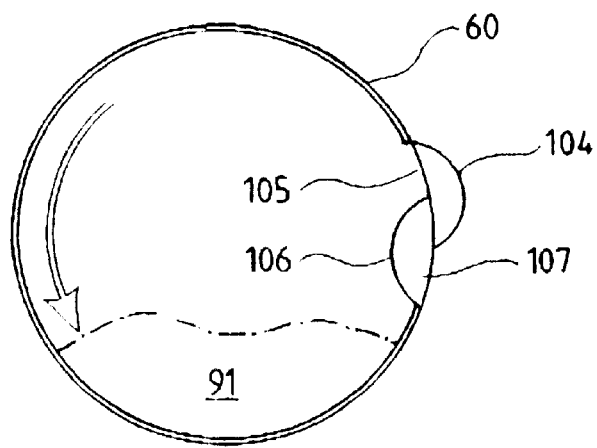

In FIG. 5c, baffle 104 is mounted to the exterior of the container body 60 and is adjustably mounted to the body to vary the size of opening 105 and may be locked in a desired position. In this way, the amount of soil collected by baffle 104 as the container rotates may be adjusted. Further rotation of the container then allows soil collected by baffle 104 to fall onto baffle 106 which in turn directs that soil through opening 107 and onto the plastic film.

Figure 6C:
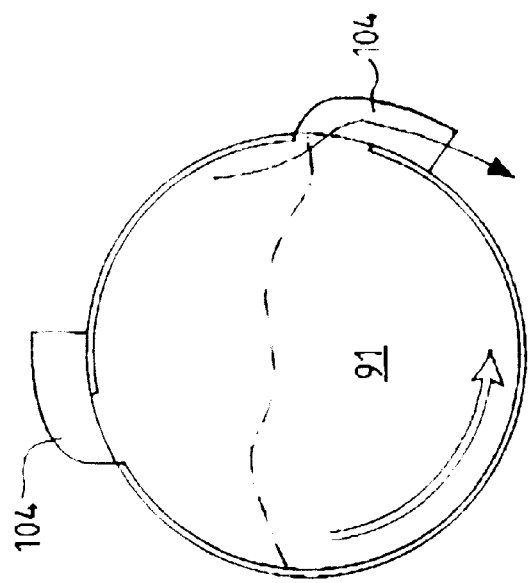
Figure 6B:
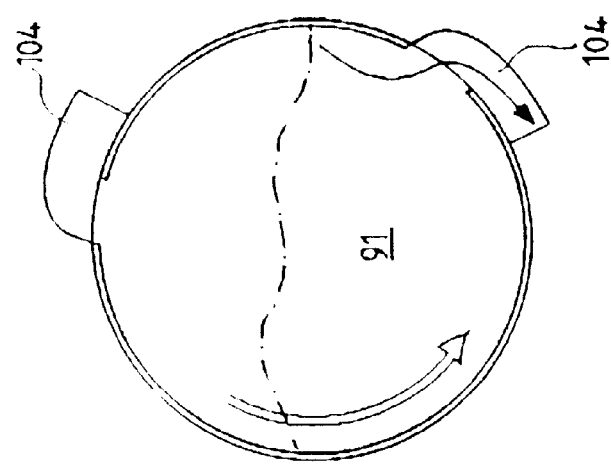
Figure 6A:
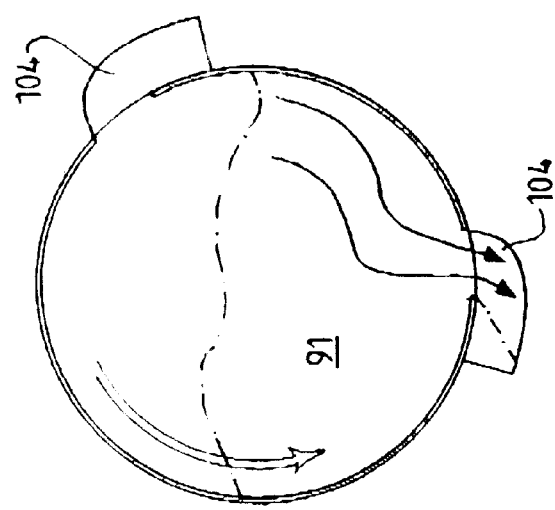

FIGS. 6a, 6b and 6c show detail of how the preferred metering means of the invention functions to dispense material from the container body 60.

Figure 7:
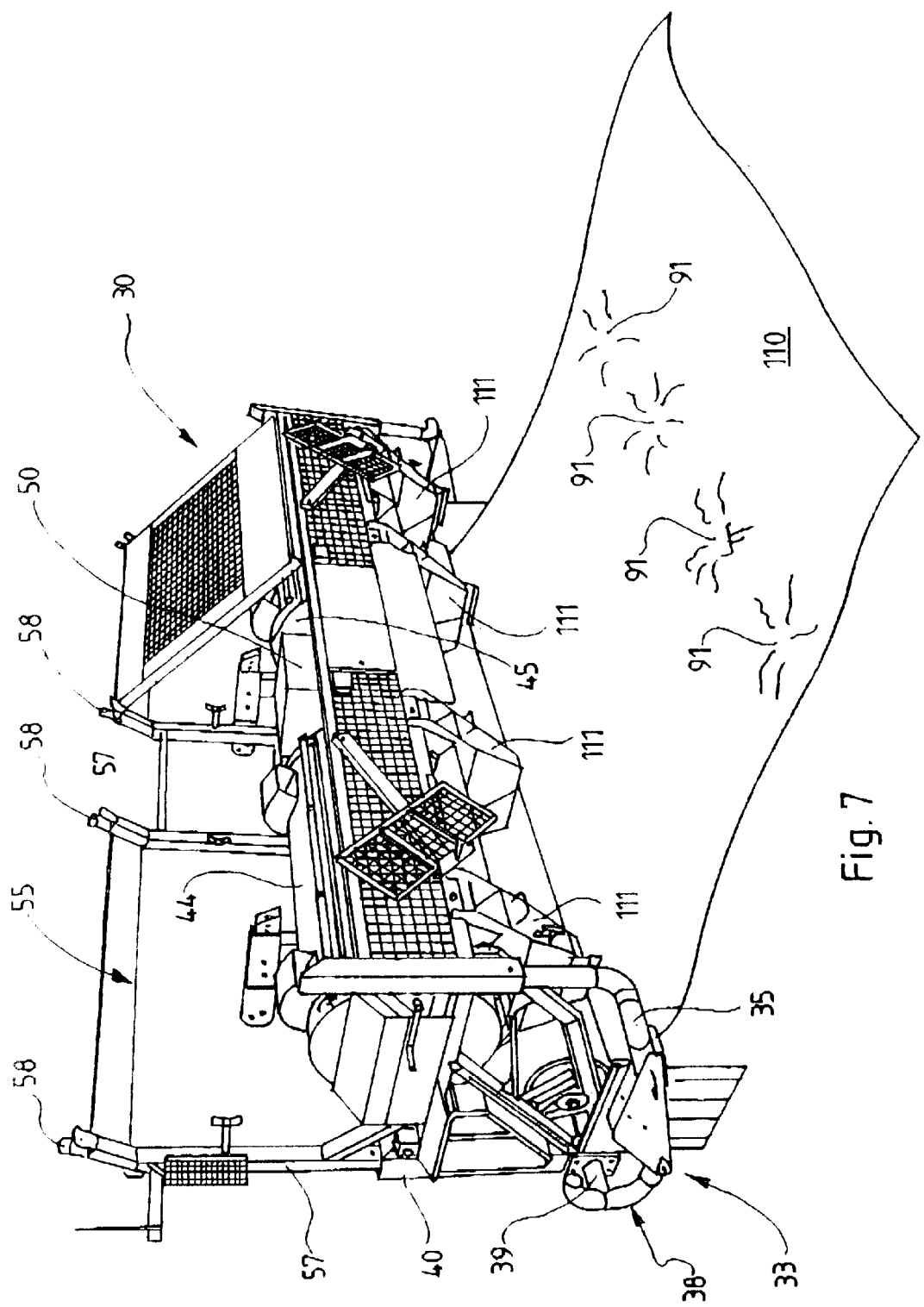
FIG. 7 is a perspective view of the apparatus of the invention shown in use.

FIG. 7 shows the apparatus 30 of the invention in use. In this view, the feet 34 have been raised from the position shown and one of the screen grates has been removed. The apparatus may be secured to and carried by a vehicle (not shown) and moved over the surface being covered by the film 110. The movement of the apparatus is in the direction of the arrow shown in the figure. Drive 50 rotates the two containers 44 and 45 as the apparatus is moved, discrete quantities of material 91 are deposited onto the film 110. The material exits through the dispensing means previously discussed and that material is guided in its movement from the containers and onto the film 110 by shutes 111 to anchor the film in place. The apparatus may be transported over the surface to perform a plurality of covering runs to lay out slightly overlapping strips of film 110.

Figure 8B:
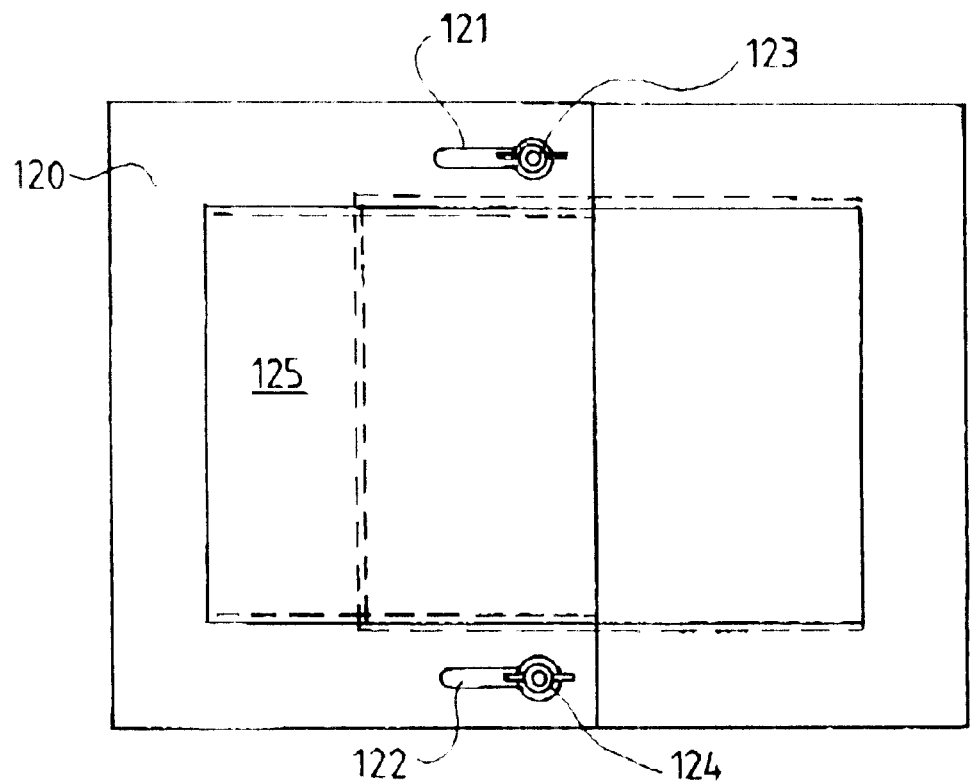
FIGS. 8a and 8b are side and plan views of the metering means of FIG. 5c.
Figure 8A:
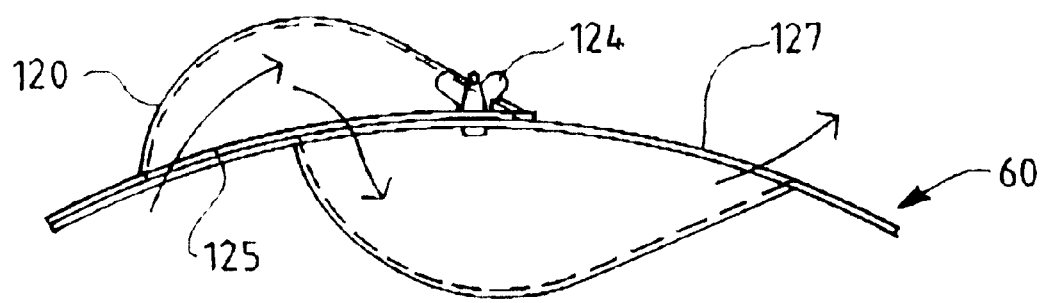

FIGS. 8a and 8b show an embodiment of a metering means. The metering means includes a baffle 120. The baffle 120 has slots 121, 122. Fasteners 123, 124 are fixed to the body 60 of the containers and extend through the slots to clamp the baffle 120 to the body 60. When the fasteners are loosened the baffle may be moved to alter the size of opening 125 extending between the baffle 120 and the interior of the body 60. Baffle 126 is fixed to the interior of the body. An opening 127 is present in the body 60 to one side of baffle 120. Opening 125 is covered by the baffle. The material within the body moves in the direction of the arrows as the container rotates and exits the container through opening 127.

By adjusting the position of the baffle 120, the quantity of discrete material dispensed from the container as it rotates may be varied by exposing a greater area of the opening 125.

Figure 9:
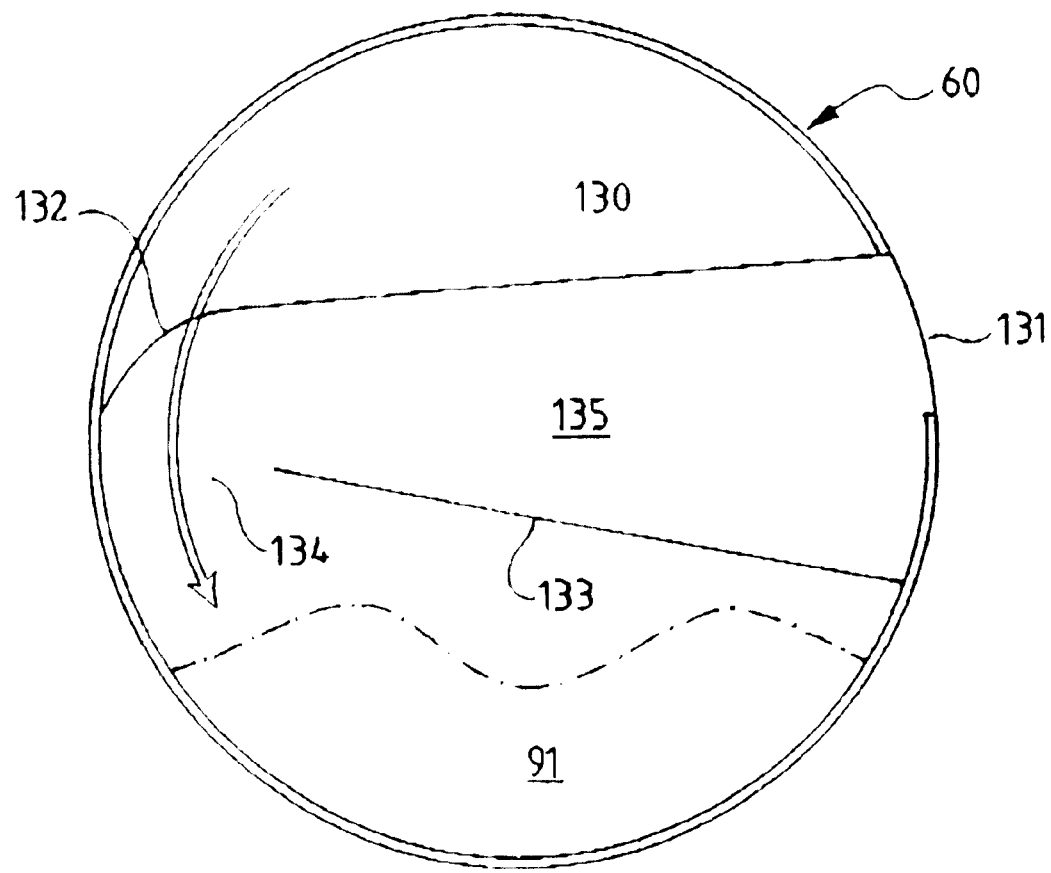
FIG. 9 is a transverse view through a container showing an alternative dispensing means.

FIG. 9 shows the configuration of an alternative metering means for dispensing material from the body 60 of a container. Two metering means of the type illustrated may be present and located at opposite ends of the container. The body 60 of the container rotates in the direction of the arrow in the figure. Plate 130 extends from opening 131 and has a curved portion 132 spaced from the opening 131. Plate 133 extends from adjacent the opening 131 and terminates short of the curved portion 132 to provide an inlet 134. A pair of opposed side walls (not visible in this view), extend between the plates 130 and 133 to form an enclosed passage 135 extending between inlet 134 and the opening 131. One of the side walls may be provided by a circular end wall of the container 44. As the container rotates material 91 within the body 60 of the container passes through the inlet 134 and into the passage 135. After further rotation, the material exits through opening 131 to be deposited onto the film 110.

Figure 10:
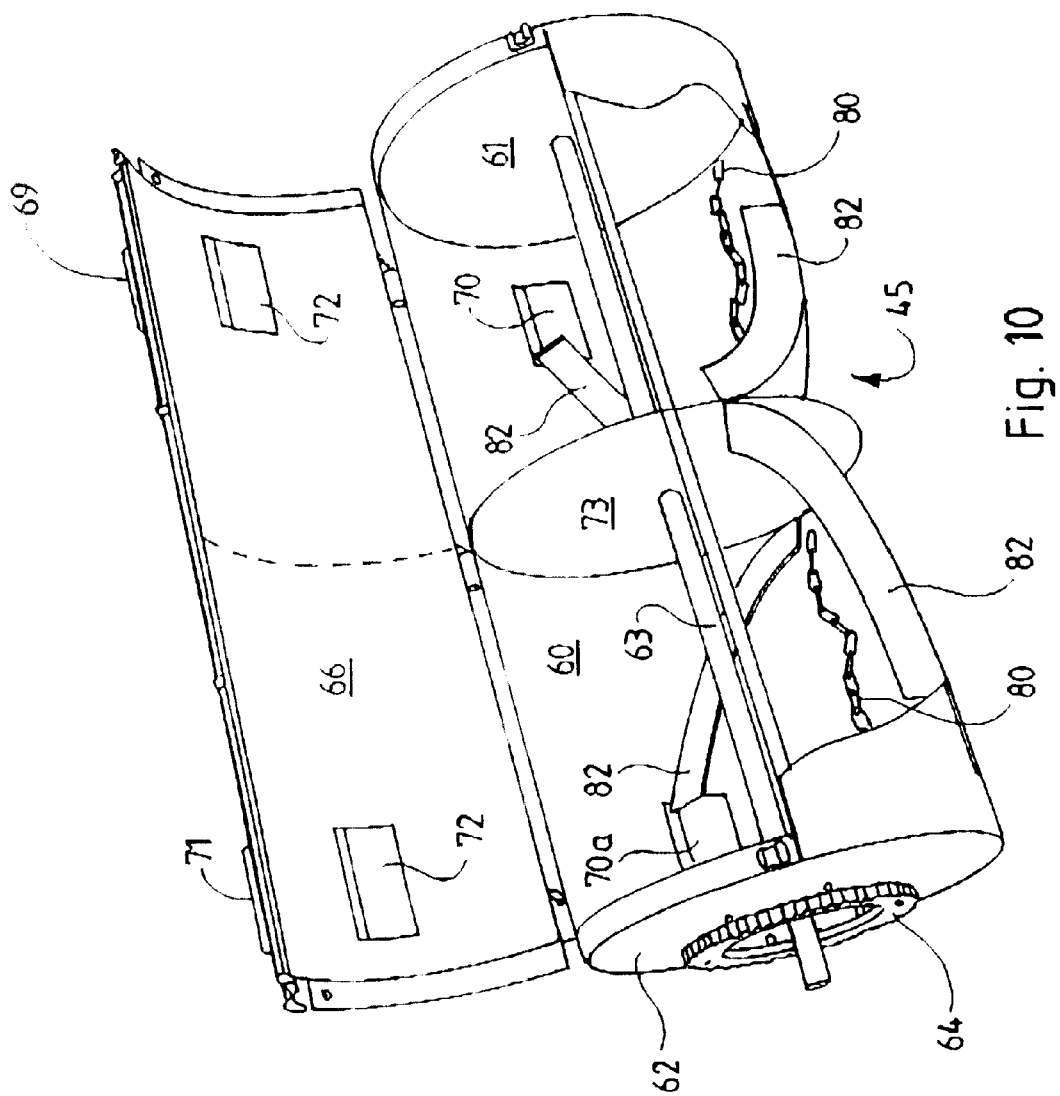
FIG. 10 is a perspective view of a container for an apparatus of the invention.

FIG. 10 shows a container like that illustrated in FIGS. 1 to 3 of the drawings. Container 45 has a body 60 with two circular ends 61, 62. An axle 63 extends through the container and the container is divided into two compartments by partition 73. Metering means 69, 70, 71 and 70a are provided in the container. Means 69 and 71 are in the lid 66 and means 70 and 70a are in the body. Part helical flights 82 are located within the two compartments and act to direct material within the container towards the metering means as the container rotates. Chains 80 assist in breaking up large pieces of the material within the container.

Figure 11:
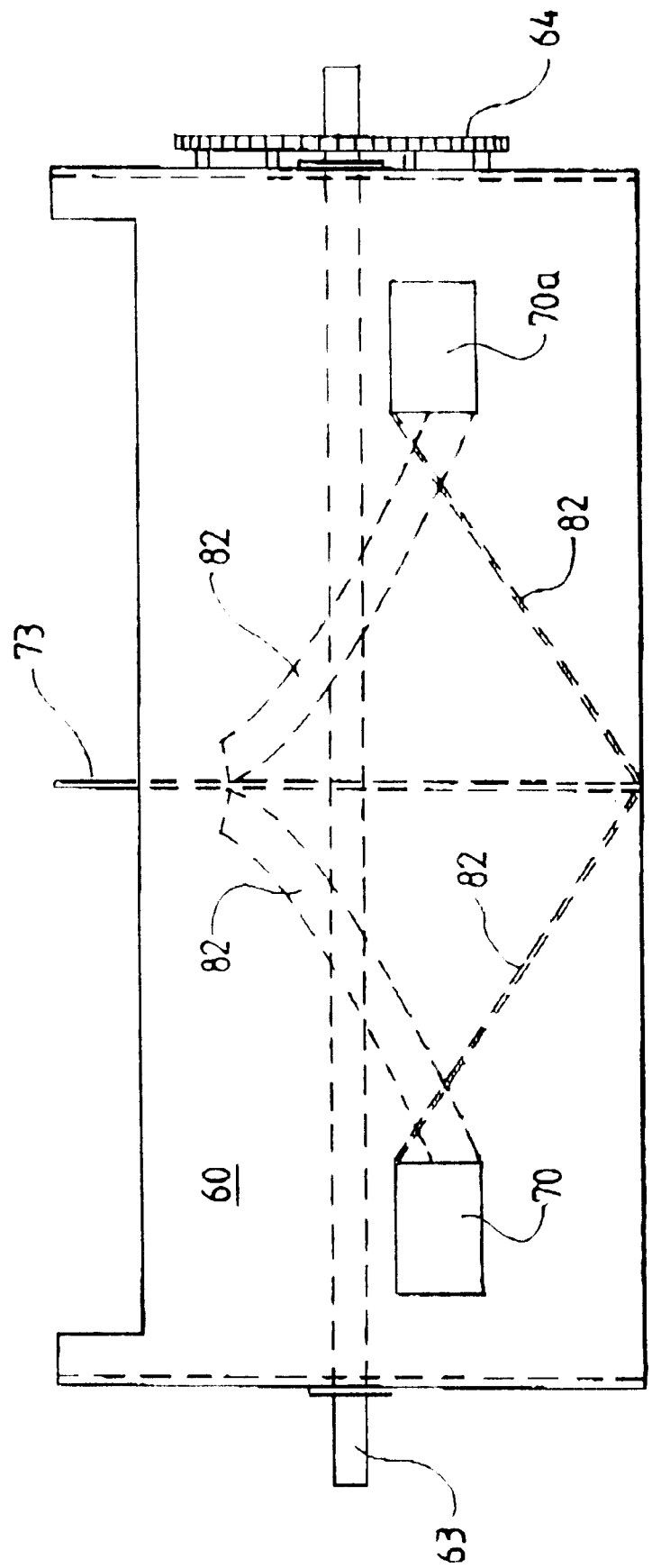
FIG. 11 is a front elevational view of the container of FIG. 10.

FIG. 11 shows an elevational view of the container illustrated in FIG. 10. If the metering means at one end of the container is starved of material during use such as when the container is conveyed across a slope, the configuration adopted for the flights may be varied from the symmetrical configurations shown. For example, the height of the flights may be greater near the partition 73 and the tendency for starving one of the metering means is then minimised.

Figure 12:
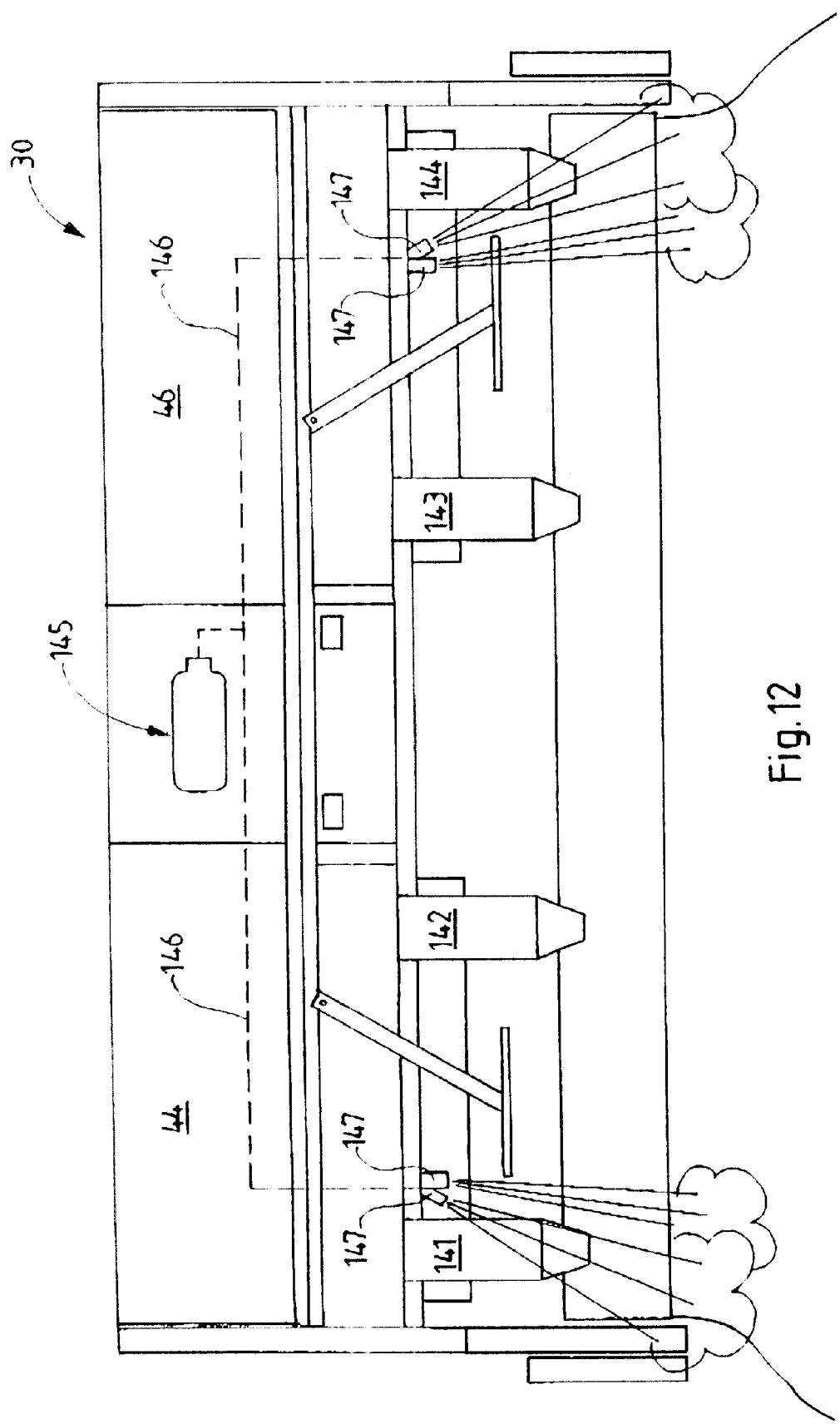
FIG. 12 is a front elevational view of an apparatus incorporating improvements according to another embodiment of the invention.

FIG. 12 shows modifications which may be incorporated into the apparatus described so far. The apparatus 30 has two containers 44 and 46 and directing shutes 141, 142, 143 and 144 are arranged beneath the containers for directing material dispensed by the metering means onto the film so that the material is not adversely affected by wind. The apparatus 30 has an air compressor which supplies air to an accumulator 145. Lines 146 supply the air to downwardly directed outlet nozzles 147. These nozzles direct the air onto the film to avoid displacement of the film by adverse windy conditions prior to the dispensing of material onto the film from the containers.

Figure 13:
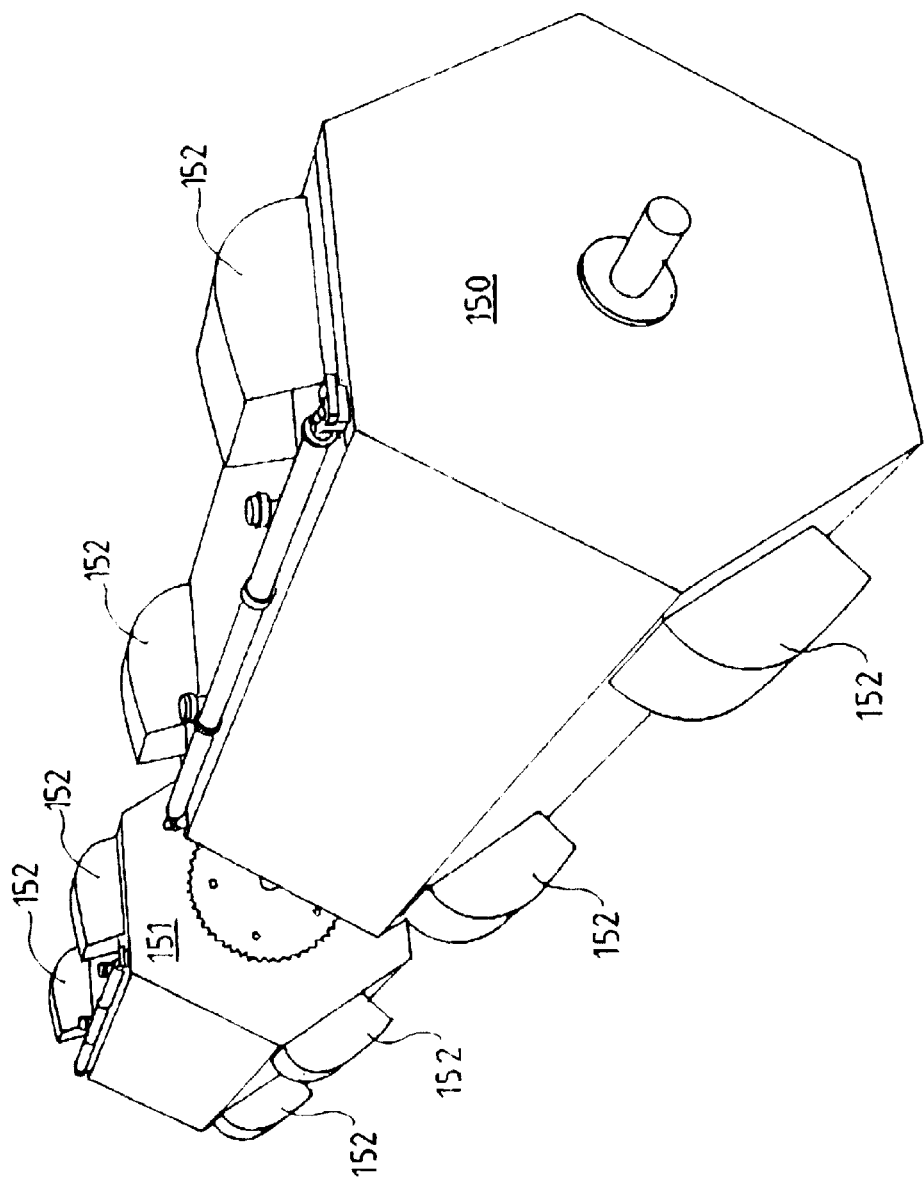
FIG. 13 is a perspective view of an alternative container configuration for the apparatus of the invention.

FIG. 13 shows a variation to the container shape to that illustrated in the previous figures. Rather than the containers being cylindrical in shape, the containers 150, 151 may be hexagonal in transverse section shape. Of course, other shapes are not excluded. Thus, the containers need not be cylindrical and may have flat faceted sides. The effect of this is to lessen the effect of centrifical force working against gravity feed of anchoring material through the outlets/metering means 152. The shape and configuration of flights within the containers of course are suitably changed to adapt to the interior shape of such containers.

Figure 14:
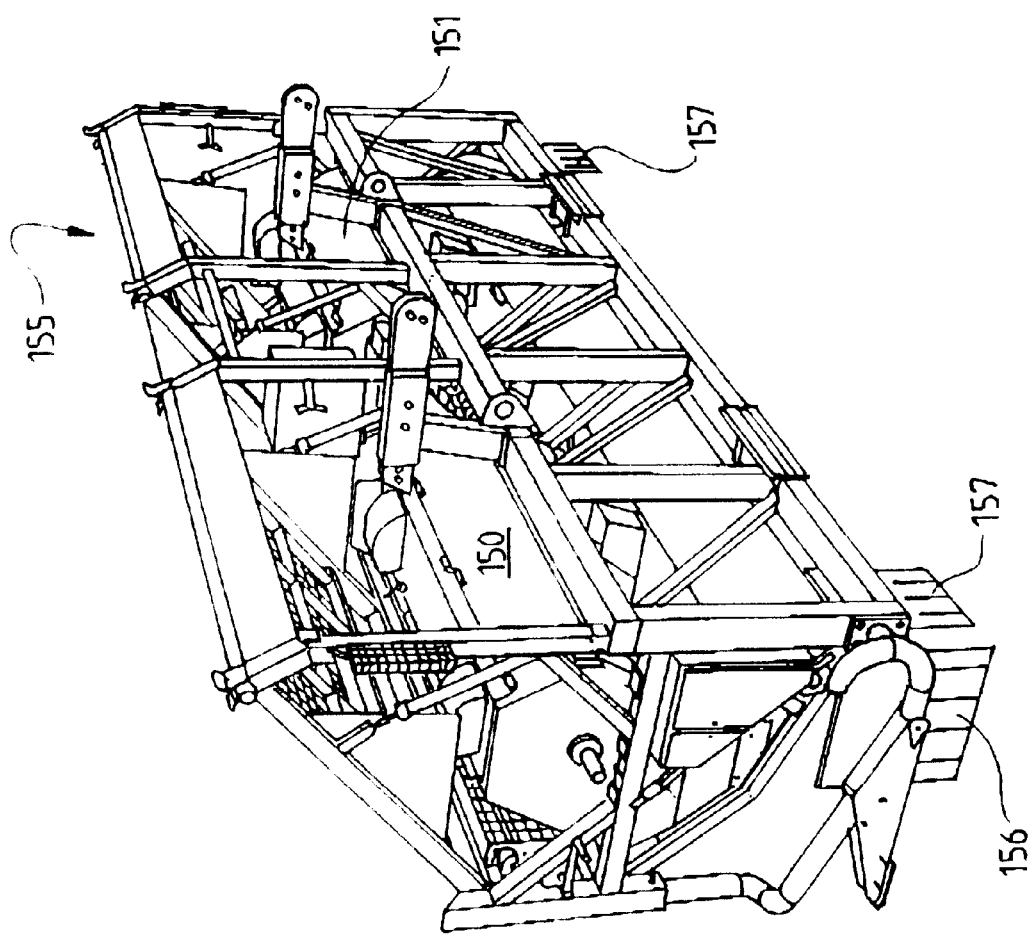
FIG. 14 shows a perspective view of an apparatus incorporating the containers shown in FIG. 13.

FIG. 14 shows a perspective view of an apparatus 155 to which containers of the type illustrated in FIG. 13 have been fitted. This apparatus has downwardly extending flaps 156, 157 for lessening the effects of cross winds.

FIGS. 15 to 19 show details of a loading mechanism for loading and positioning a roll of plastic film relative to an apparatus 160 of the invention.

Figure 18:
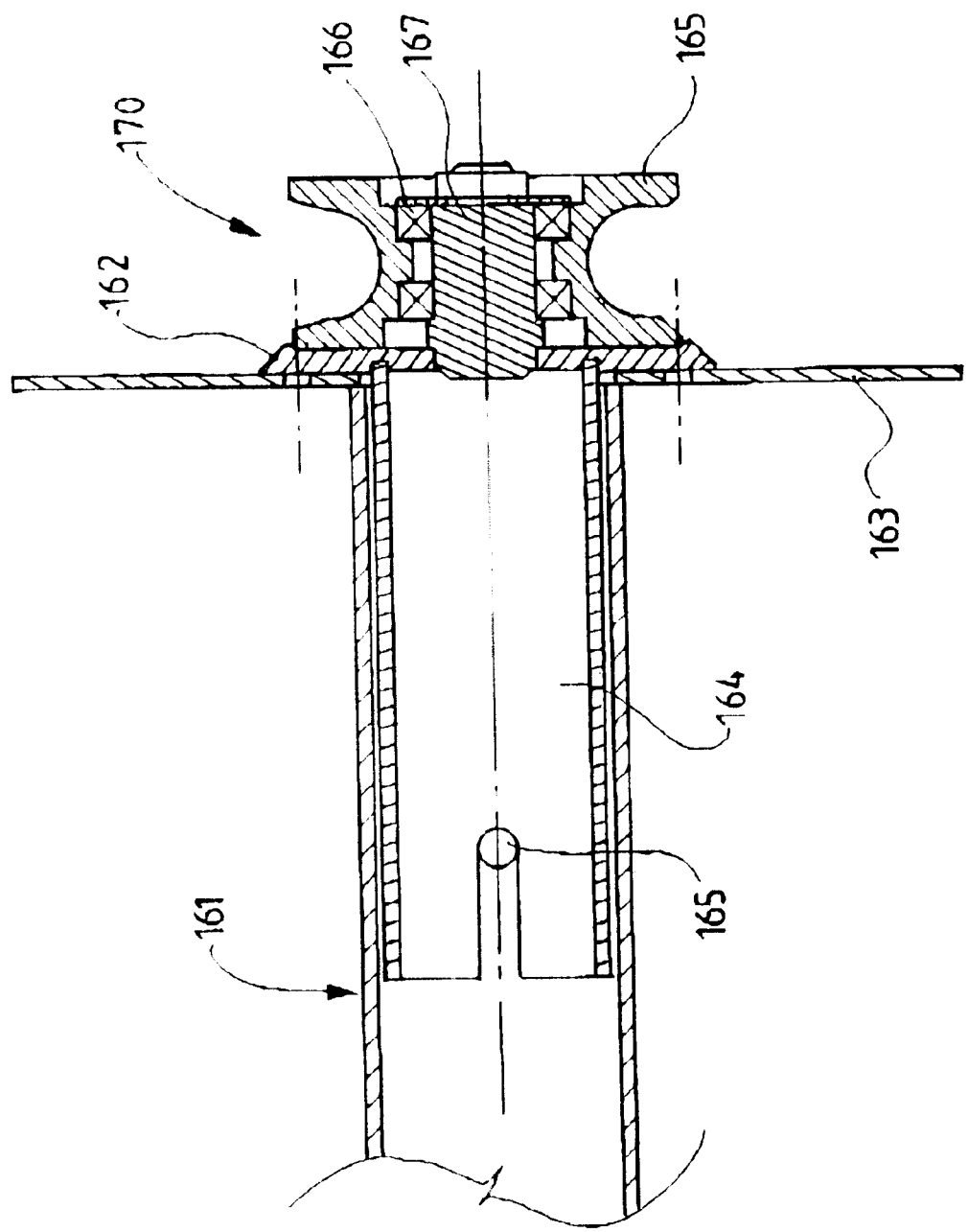
FIG. 18 shows detail of end caps fitted to a pipe which carries the film roll.
Figure 19:
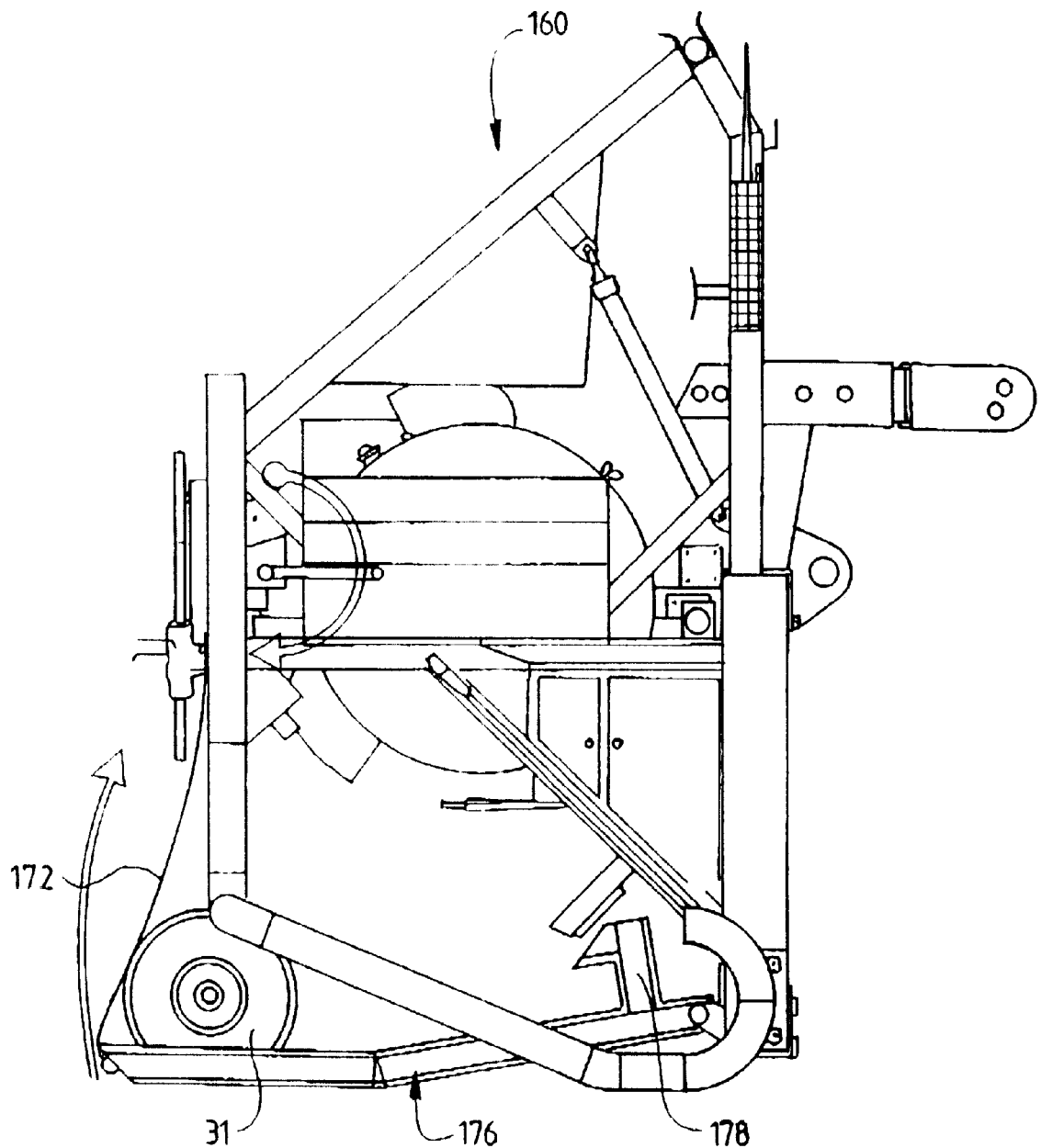
FIG. 19 is a side elevational view of the apparatus of FIG. 16.

FIG. 18 shows details of end caps 170 fitted to ends of a mandrel 161. A spacer plate 162 separates end cap 170 from a flange 163 and shaft 164 extends from the flanges 165 into the mandrel 161. Locking pin 165 locks shaft 164 relative to the mandrel 161. Roller 165 has a bearing 166 for securing it for rotation relative to shaft 167.

The roll 21 is fitted with a mandrel tube 161 and end caps 170 are fitted to opposite ends of the mandrel. Straps 171, 172 are secured to caps 170 and attach the roll carried by the mandrel 161 to a winch 163. Loading arms 175, 176 are pivotally coupled to a frame member of the apparatus and guide the movement of the roll 31 as it is winched towards the apparatus 160. The arms 175 and 176 have a retaining hook or claw 177, 178. When the straps 171, 172 lift the roll 31, the caps engage the hooks 177, 178 and lift the arms to the position shown in FIG. 17 which effectively locks the roll into position. The roll 31, when depleted, may be removed from the apparatus by releasing the winch and a fresh roll of film may be loaded into position. The plastic film need not be degradable or biodegradable. The film may consist of erosion control sheeting or netting. Any other material besides plastic which may be dispensed from a roll may be used in this apparatus. For example, hessian or paper may be used. The plastic sheeting need not only be positioned in landfill situations but may be used in other situations or for purposes other than covering landfill sites. The straps may remain connected to the end caps or disconnected and coupled to ends of the arms 175, 176 to move the roll 21 into position.

Figure 20:
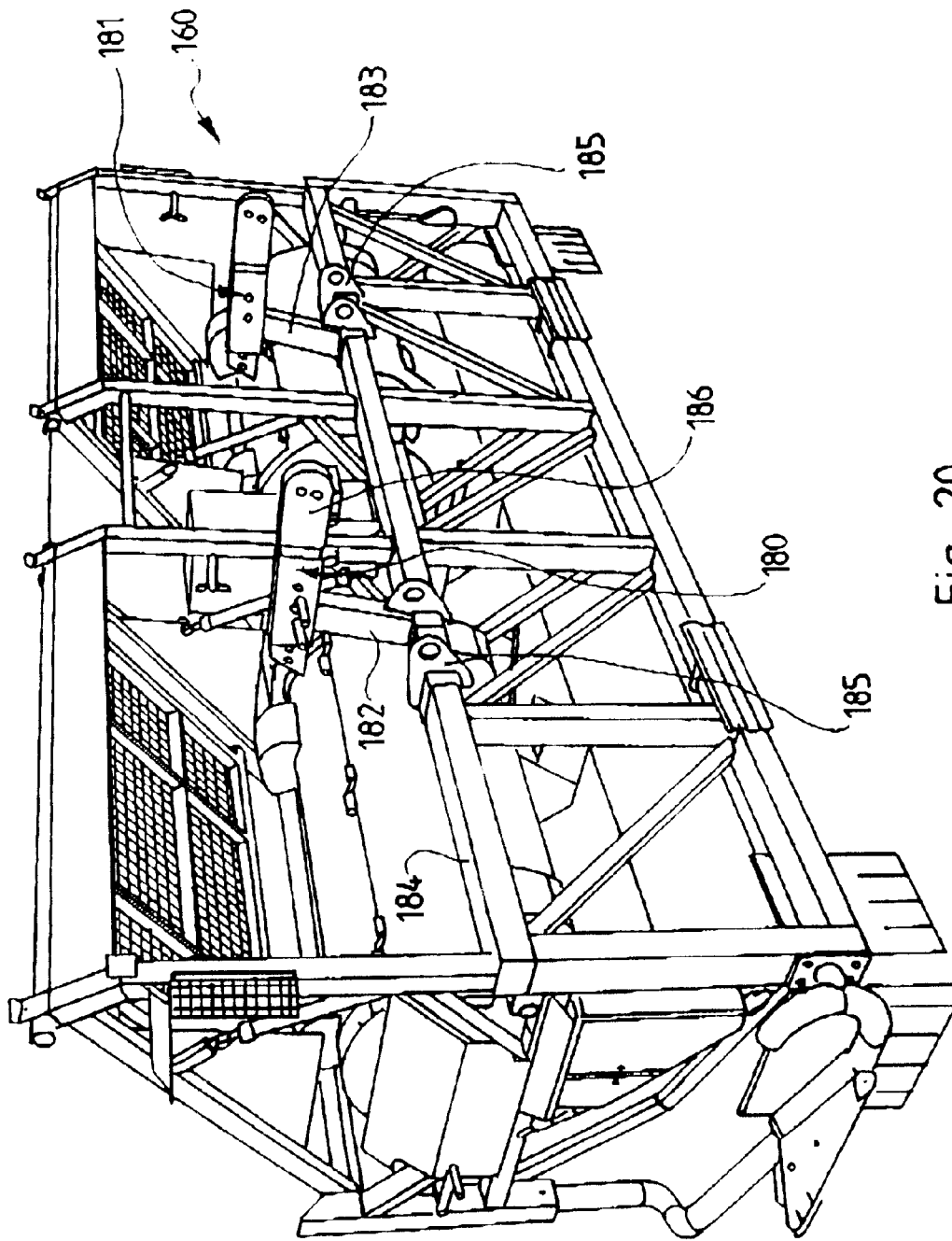
FIG. 20 is a perspective view of the apparatus of the invention with a hitch attachment shown.

FIG. 20 shows detail of a hitch attachment which allows the apparatus 160 be easily secured to a vehicle to allow the apparatus to be transported during use.

The hitch attachment consists of two hitch arms 180, 181 each having a T shaped mount 182, 183 secured to frame member 184 of the apparatus. Hitching brackets 185 with an aperture as shown are mounted to the frame member 184 and may be used as an alternative to the hitching arm. An upper part of each mount 182, 183 is tubular and receives a respective arm 186, 187. The arms 186, 187 may be secured at a desired extension relative to the tubular part of the mounts 182, 183 and the free end of each of the arms may be secured to the vehicle which transports the apparatus 160. The mounts 180, 181 are movable along member 184 and may be selectively positioned along the length of member 184.

Figure 21:
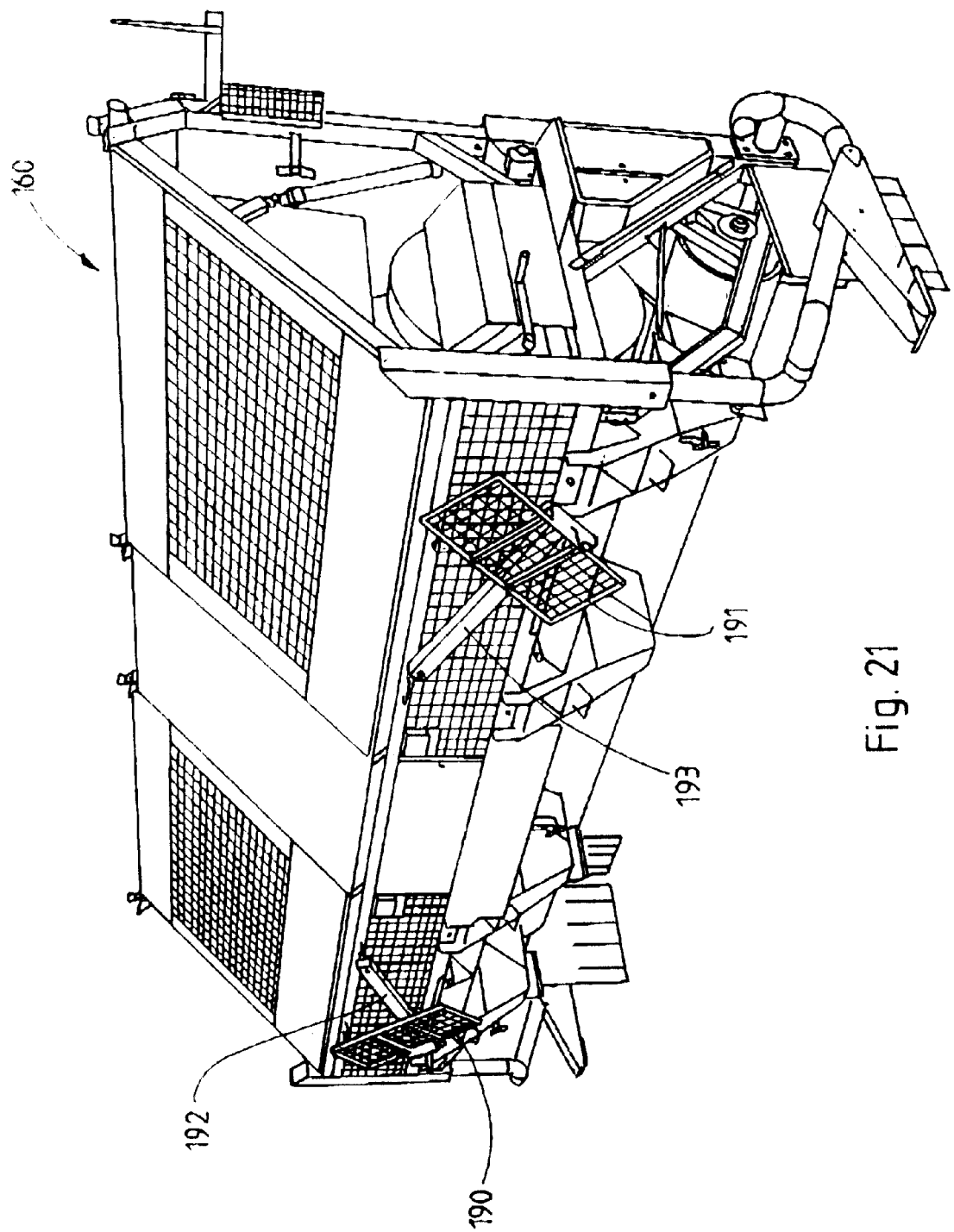
FIG. 21 is a perspective view of the apparatus of the invention shown in a storage position.
Figure 22:
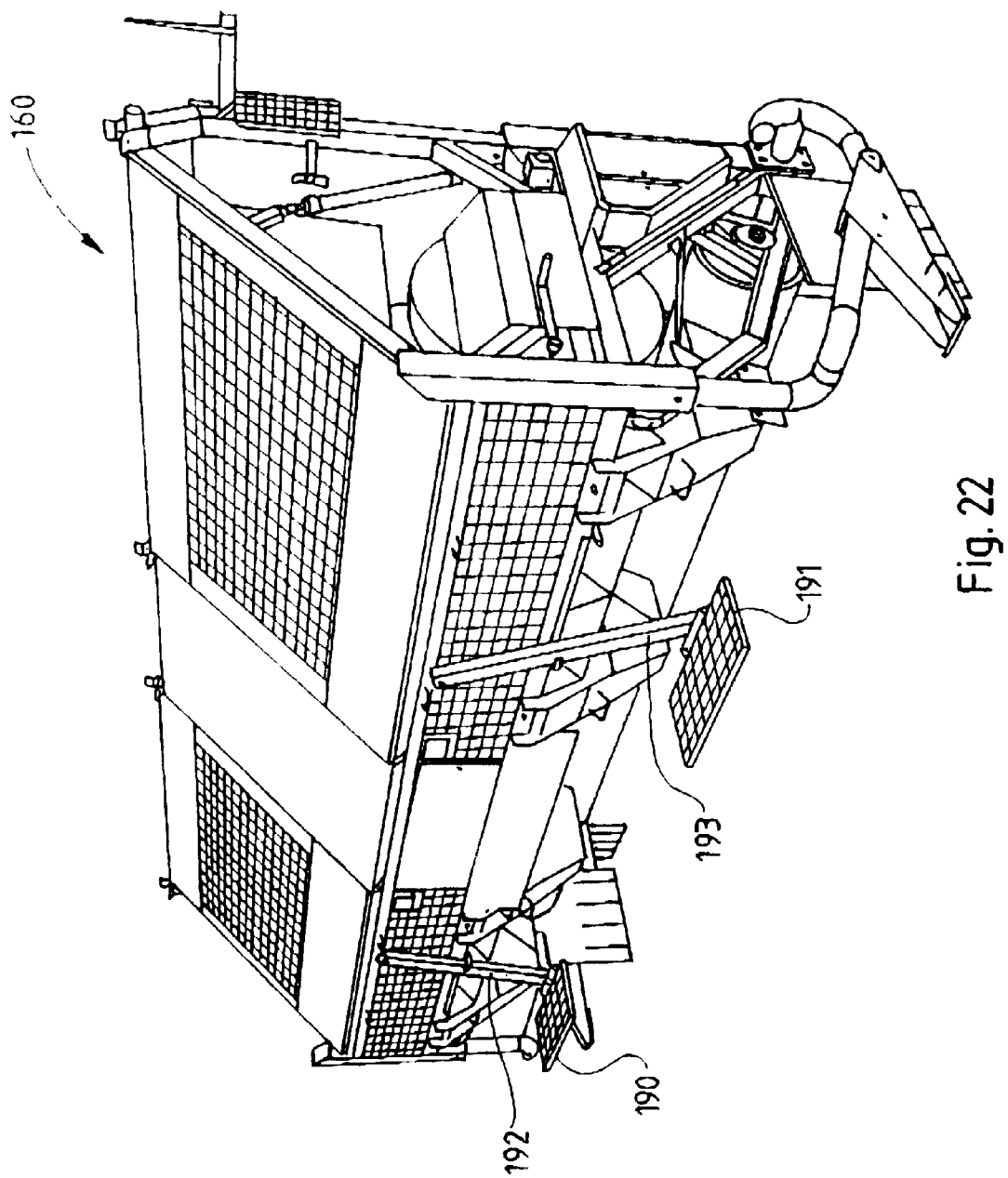
FIG. 22 is a perspective view of the apparatus of FIG. 21 with steps in a deployed position.

FIGS. 21 and 22 show an apparatus 160 with retractable steps 190, 191. The steps are secured to ends of arms 192, 193 pivotally coupled to the apparatus.

The steps may be moved between the FIG. 21 storage position to the FIG. 22 deployed position.

Figure 23:
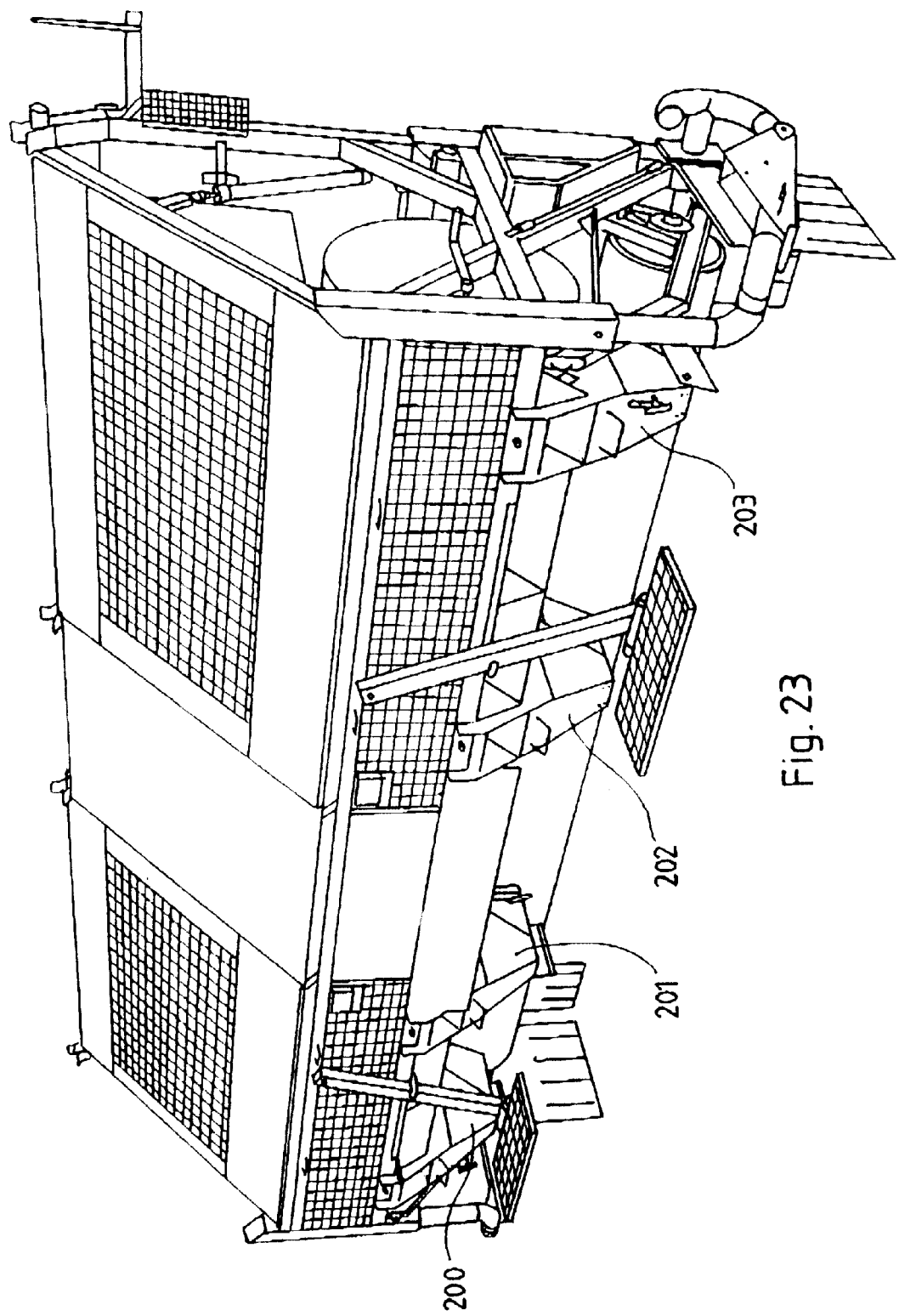
FIG. 23 is a perspective view of the apparatus showing dispensing shutes.

FIG. 23 shows the apparatus 160 with a plurality of chutes 200, 201, 202, 203 mounted to the frame of the apparatus and below the container or containers mounted to the apparatus. A respective chute is associated with each metering means as the means is moved to a dispensing position adjacent the surface onto which material from the container/s is dispensed. The chutes direct the anchoring material closer to the plastic film and assist in minimising the effects of wind. Deflectors may be attached to lower ends of the chutes to direct the anchoring material in a desired fashion. Each chute may have a compartment which ensures that the anchoring material falls effectively onto the plastic film.

Figure 24:
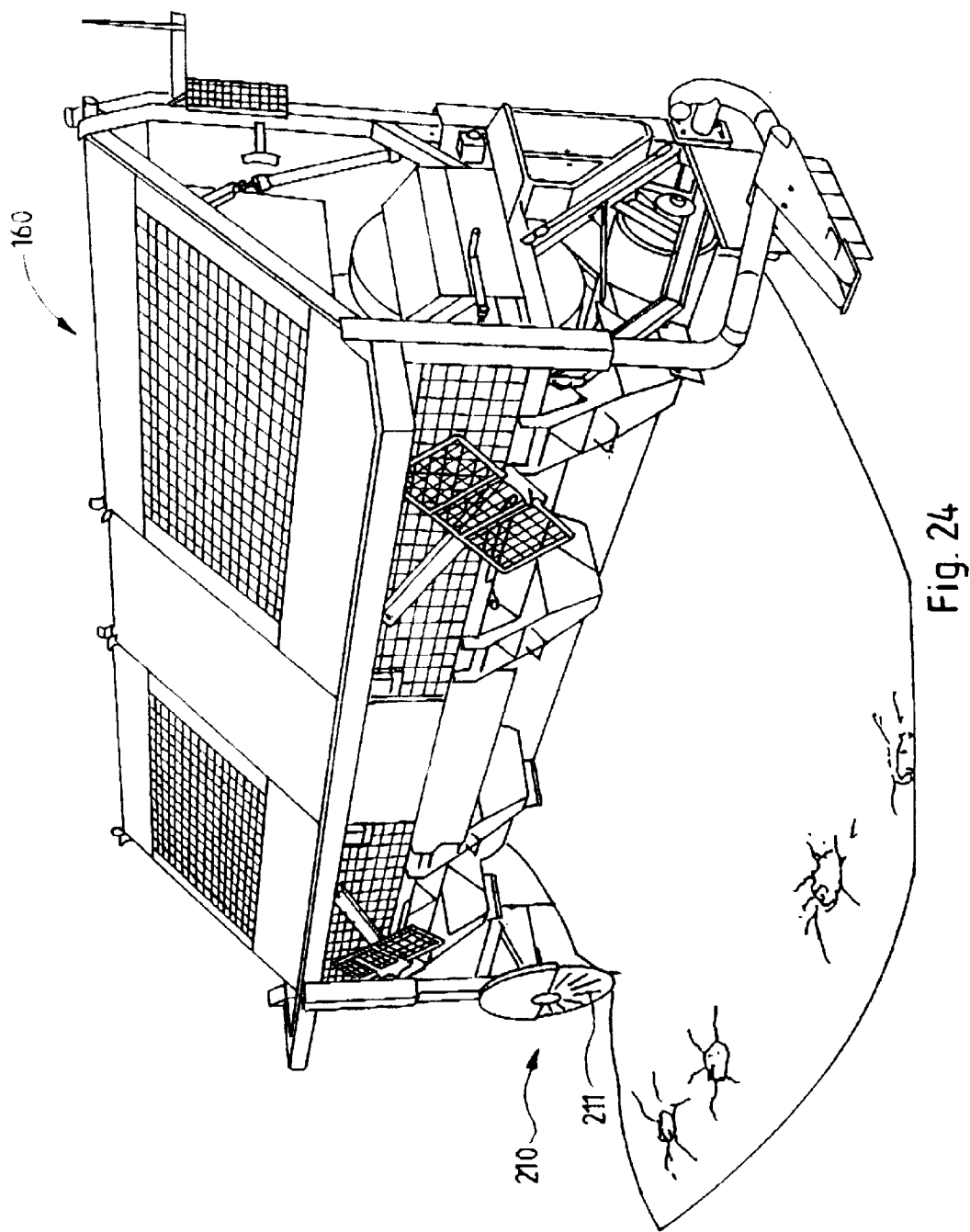
FIG. 24 is a perspective view of the apparatus showing a film cutter.

FIG. 24 shows an apparatus 160 having a film cutter head 210 mounted to the apparatus for movement along the apparatus. The head has a cutting cord 211 which is caused to rotate and cut though the film. The accumulator 145 shown in FIG. 12 may be reversed and used to operate suction cups (not shown) to hold the plastic taut to assist cutting of the plastic by the cutter head. In addition, these suction cups may be used to hold the plastic clear of the ground so that it does not drag on the ground when the apparatus is being moved to another location.

As an alternative to using suction in conjunction with the cutter head operation the roll may be driven to take up excess material.

FIGS. 25a, b and c show an alternative metering means to that shown in FIG 8. The means 230 is fixed relative to a wall 231 of a container. The means has an outer baffle 232 having an outlet 233 and an inner end 234 and two opposed side walls 235, 236. The baffle has a curved outer wall 237.

The wall 231 has an opening 238 the width of which is identified by the dotted lines 240, 241 in FIG. 25b.

The baffle 230 is secured to the wall 231 by fasteners 250, 251 which pass through slots 252, 253 in a skirt 254 extending around the baffle. The fasteners locate relative to a curved plate 255, positioned adjacent an inside portion of the wall 231. The fasteners may be loosened and the baffle moved along the wall and repositioned and fixed at a new location to allow the size of the opening 238 to be varied.

In this way, the baffle may be adjusted to alter the quantity of material dispensed from the container as the container rotates. Material is dispensed from the container. The material passes through the opening 238 and into the space within the baffle. Further rotation of the container causes the material to exit through outlet 233.

Figure 15:
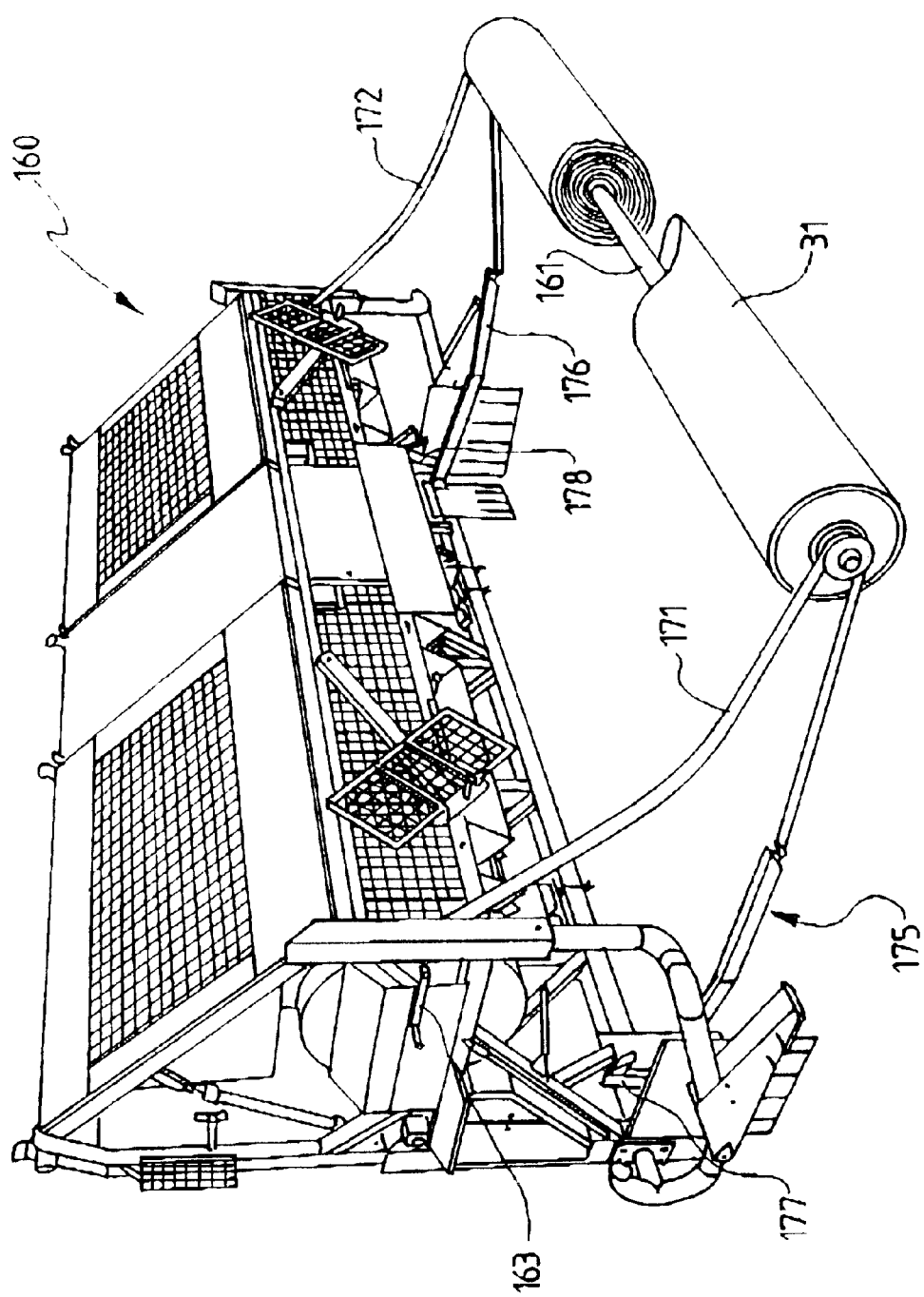
FIG. 15 shows a perspective view of one way in which an apparatus of the invention may be loaded with a roll of plastic film.
Figure 16:
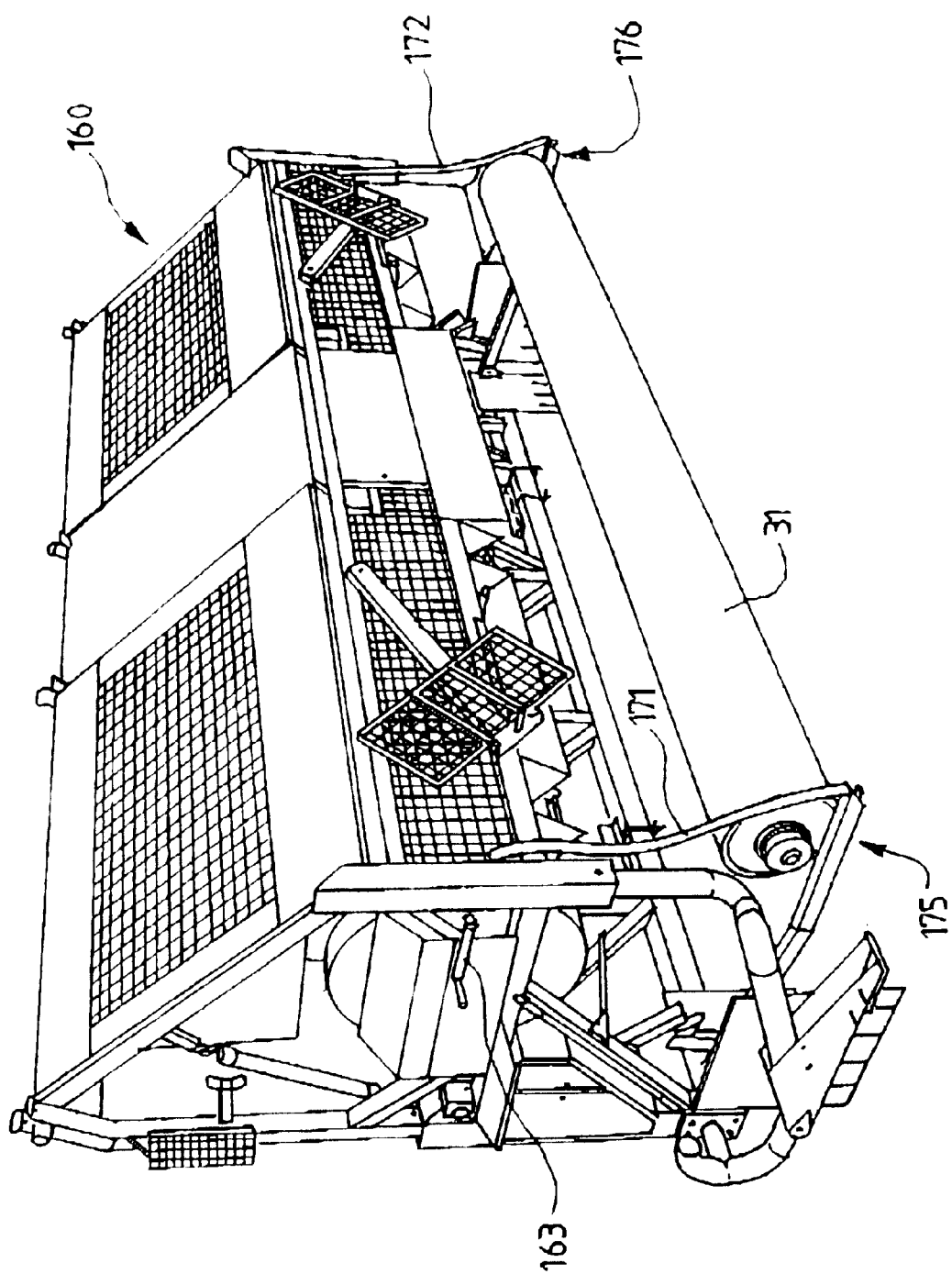
FIG. 16 shows a perspective view of how the film may be loaded showing the film roll partially loaded relative to the apparatus.
Figure 17:
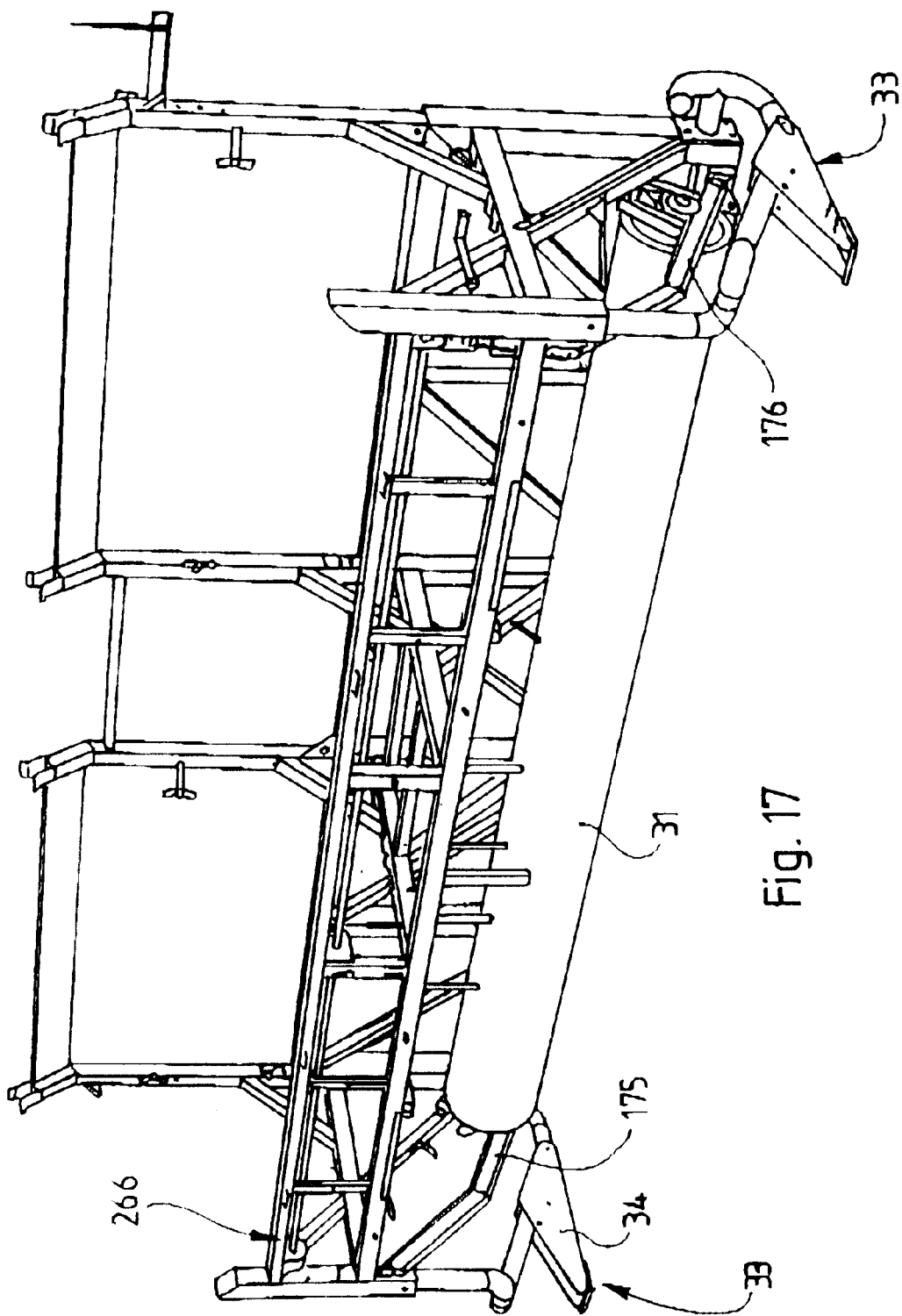
FIG. 17 shows a perspective view of the apparatus of FIG. 16 with the film roll in its loaded position.

FIGS. 14 and 15 show details of the screens 260 mounted relative to the stirrups 58 (see FIG. 1). The screens 260 each have a frame 261 and mesh 262 carried by the frame. A rod 263 extends across the frame 261 and has opposite ends received by the stirrups 58. The frame has a plate 264 and a flange 265 over a frame member 266 (see FIG. 17) of the apparatus.

The screens 260 may be pivoted from the position shown in FIGS. 14 and 15 or removed if necessary. The lids of the containers 150, 151 may be opened and material deposited onto the screens may then be fed into the containers.

Figure 26:
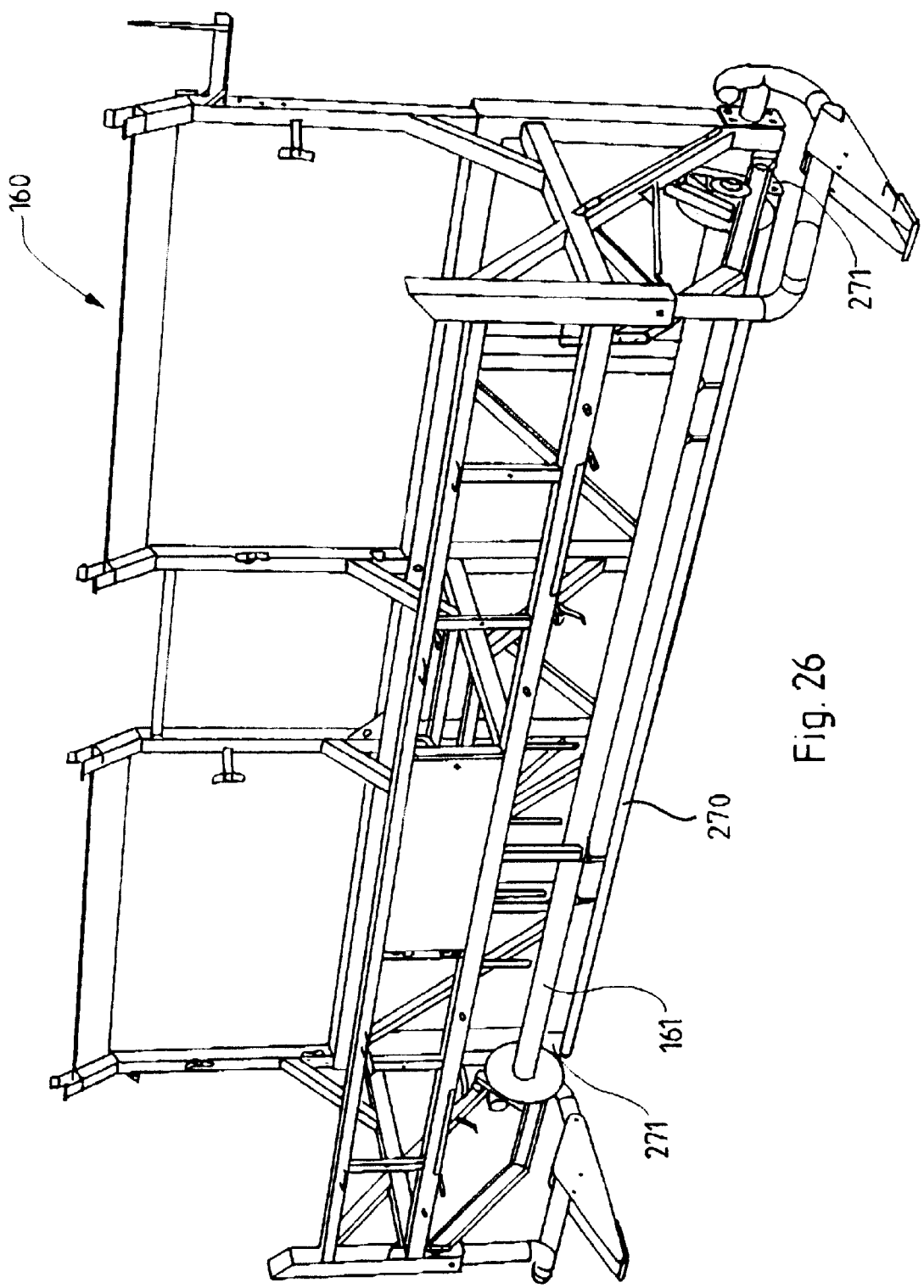
FIG. 26 is a further elevational view of part of the apparatus of the invention.

FIG. 26 shows the frame of the apparatus 160 and the mandrel 161 for receiving a roll of film material. A tension roll 270 extends between plates 271 secured to the frame. This tension roll 270 is located beneath and forwardly of the mandrel. Film on the roll is fed over the roll 270 and in this way, the film is maintained close to the surface onto which it is being laid regardless of the amount of film material left on the mandrel.

What is claimed is:

1. An apparatus having at least one rotatably mounted storage container, at least two outlet openings in the container from which material within the container may be dispensed as the container rotates such that a discrete amount of material is dispensed from each outlet opening once per rotation of the container, the outlet openings being located at longitudinally spaced locations in the container, a respective metering means for collecting the discrete amount of material from each outlet opening and for dispensing the discrete amount of material as the container is caused to rotate onto a roll of material carried by the apparatus and mounted to pay out material from the roll as the apparatus is transported over a surface whereby the discrete amounts of material dispensed from the metering means are deposited at spaced locations onto the material from the roll to anchor the material from the roll relative to the surface.

2. The apparatus of claim 1 wherein the container has a partition extending across it for dividing the interior of the container into two compartments.

3. The apparatus of claim 2 wherein the compartments are of an equal volume.

4. The apparatus of claim 2 including an agitator located within each said compartment.

5. The apparatus of claim 4 wherein the agitator is a chain fixed to an inside surface of the container.

6. The apparatus of claim 1 wherein each said metering means consists of a baffle on an exterior surface of the container adjacent a respective said opening.

7. The apparatus of claim 6 wherein each said baffle extends from or adjacent an edge of the respective said opening and terminates beyond an opposed edge of the opening to provide a receiving space for the material from the container between the baffle and the container.

8. The apparatus of claim 7 wherein each said baffle is adjustably mounted to the container so that its position relative to the container may be varied to vary the amount of the discrete material dispensed from the container per revolution of the container.

9. The apparatus of claim 8 wherein the baffles are arcuate in shape.

10. The apparatus of claim 9 wherein the metering means are located at radially displaced locations relative to one another.

11. The apparatus of claim 10 including a respective directing flight within the container associated with one of the openings for directing material within the container towards the associated said opening.

12. The apparatus of claim 11 wherein each said directing flight consists of an inwardly directed flange secured to an inner wall of the container and extending along a part helical path.

13. The apparatus of claim 12 wherein the flange is higher at a location spaced from the opening.

14. The apparatus of claim 9 wherein the container has a filling opening normally closed off by a lid.

15. The apparatus of claim 14 including a screen extending across the filling opening for screening material deposited into the container.

16. The apparatus of claim 9 including an additional container longitudinally spaced from said at least one container.

17. The apparatus of claim 16 wherein the containers have a circular transverse cross-sectional shape.

18. The apparatus of claim 8 including a deflector plate associated with each said outlet opening and extending from the one edge of the opening and into the container.

19. The apparatus of claim 7 including a respective foot at each end of the apparatus and movable between a raised position and a lowered position.

20. The apparatus of claim 6 including downwardly extending guide shutes extending beneath the container/s for directing the dispensed discrete quantities of material onto the material from the roll.

21. The apparatus of claim 6 including towing arms extending forwardly of the apparatus for coupling to a vehicle for allowing the vehicle to transport the apparatus over the surface.

22. The apparatus of claim 1 wherein said metering means consist of two baffles adjacent a respective outlet opening.

23. The apparatus of claim 22 wherein one of the baffles adjacent an outlet opening comprises a collecting baffle located within the container into which a discrete quantity of material is deposited as the container rotates and the other baffle is a deflecting baffle located outside the container for receiving material from the collecting baffle and for dispensing the material onto the material from the roll as the container rotates.

24. The apparatus of claim 23 wherein the deflecting baffle is adjustably mounted relative to the container so that the quantity of discrete material dispensed from the container per rotation of the container may be varied.

25. The apparatus of claim 22 wherein the baffles are arcuate in shape.

26. The apparatus of claim 25 including an additional container longitudinally spaced from said at least one container.

27. The apparatus of claim 26 wherein the containers have a circular transverse cross-sectional shape.

28. The apparatus of claim 22 including a respective foot at each end of the apparatus and movable between a raised position and a lowered position.

29. The apparatus of claim 28 wherein the feet are pivotally movable between their two positions.

30. The apparatus of claim 29 including a cutter adapted to travel along the apparatus for cutting transversely through the material from the roll.

31. The apparatus of claim 1 including an upstanding frame and at least one screen carried by the upstanding frame for screening material deposited into the container.

32. The apparatus of claim 1 including steps secured to the apparatus and movable between a storage and a deployed position.

* * * * *